(12) United States Patent
Noerpel et al.

(10) Patent No.: US 9,942,082 B2
(45) Date of Patent: Apr. 10, 2018

(54) MODULATION AND CODING FOR A HIGH ALTITUDE PLATFORM

(71) Applicant: Hughes Network Systems, LLC, Germantown, MD (US)

(72) Inventors: Anthony Robert Noerpel, Lovettsville, VA (US); Stanley Edward Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 2 days.

(21) Appl. No.: 14/862,666

(22) Filed: Sep. 23, 2015

(65) Prior Publication Data

US 2017/0085411 A1    Mar. 23, 2017

(51) Int. Cl.
| | |
|---|---|
| *H04L 27/36* | (2006.01) |
| *H04W 24/02* | (2009.01) |
| *H04L 1/00* | (2006.01) |
| *H04B 7/185* | (2006.01) |
| *H04B 7/204* | (2006.01) |
| *H04W 88/16* | (2009.01) |

(52) U.S. Cl.
CPC ......... *H04L 27/36* (2013.01); *H04B 7/18502* (2013.01); *H04B 7/18504* (2013.01); *H04B 7/2041* (2013.01); *H04L 1/004* (2013.01); *H04W 24/02* (2013.01); *H04W 88/16* (2013.01)

(58) Field of Classification Search
CPC ........ H04L 27/36; H04L 12/56; H04L 1/0003
See application file for complete search history.

(56) References Cited

U.S. PATENT DOCUMENTS

| | | |
|---|---|---|
| 5,017,925 A | 5/1991 | Bertiger et al. |
| 6,201,797 B1 | 3/2001 | Leuca et al. |
| 7,068,974 B1 | 6/2006 | Linsky et al. |
| (Continued) | | |

FOREIGN PATENT DOCUMENTS

| | | |
|---|---|---|
| EP | 0825730 A2 | 2/1998 |
| EP | 0987837 A2 | 3/2000 |
| (Continued) | | |

OTHER PUBLICATIONS

International Search Report and Written Opinion—PCT/US2016/052624 dated Jan. 9, 2017.

(Continued)

*Primary Examiner* — Myron K Wyche
(74) *Attorney, Agent, or Firm* — K&L Gates LLP

(57) ABSTRACT

Modulation and coding for a high altitude platform is disclosed. An example apparatus includes a gateway antenna configured to communicate with a ground-based gateway station and user antennas configured to provide communication coverage among a plurality of terminals within a specified area on the ground or in the air. Each user antenna is configured to communicate with a cell within the specified area. The example apparatus also includes a processor configured to demodulate and decode a first modulation scheme and a first coding scheme used for a feeder link provided by the gateway antenna, and apply at least a second modulation scheme and a second coding scheme for user links provided in spot beams by the user antennas. The first modulation scheme and the first coding scheme are configured to be relatively more spectrally efficient compared to the second modulation scheme and the second coding scheme for the user links.

35 Claims, 15 Drawing Sheets

(56) References Cited

U.S. PATENT DOCUMENTS

| | | | |
|---|---|---|---|
| 2002/0145562 A1 | 10/2002 | McLain et al. | |
| 2003/0054760 A1* | 3/2003 | Karabinis | H04B 7/1853 455/12.1 |
| 2003/0207684 A1 | 11/2003 | Wesel | |
| 2008/0219266 A1* | 9/2008 | Agarwal | H04B 7/18528 370/392 |
| 2012/0191823 A1* | 7/2012 | Chow | H04B 1/0003 709/220 |
| 2014/0195150 A1 | 7/2014 | Rios | |
| 2015/0009891 A1 | 1/2015 | Miller et al. | |
| 2016/0352454 A1* | 12/2016 | Zhang | H04L 1/0003 |

FOREIGN PATENT DOCUMENTS

| | | |
|---|---|---|
| EP | 0998063 A2 | 5/2002 |
| WO | 9733790 | 9/1997 |
| WO | 2000014902 | 3/2000 |
| WO | 2014/001837 | 1/2014 |

OTHER PUBLICATIONS

Angeletti et al., "Smart Gateways Concepts for High-Capacity Multi-beam Networks", American Institute of Aeronautics and Astronautics (18 pages).

De Sanctis et al., "Feasibility Study of an Aeronautical-Satellite Broadband Communications Experiment", IEEE, 2008 (5 pages).

Evans et al., Prospects for Commercial Satellite Services at Q- and V-Bands, IEEE, 1998 (7 pages).

Gharanjik et al., "Larger Scale Transmit Diversity in Q/V Band Feeder Link with Multiple Gateways", IEEE, 2013 (5 pages).

Gharanjik et al., "Gateway Switching in Q/V Band Satellite Feeder Links", IEEE Communications Letters, vol. 17, No. 7, Jul. 2013 (4 pages)

Ho et al., "Q/V Band Satellite Feeder Links" (11 pages).

Kyrgiazos et al., "Gateway Diversity scheme for a Future Broadband Satellite System", 6th Advanced Satellite Multimedia Systems Conference, 2012 (8 pages).

Kyrgiazos et al., "On the Gateway Diversity for High Throughput Broadband Satellite Systems", IEEE Transactions on Wireless Communications, Oct. 2014, vol. 13, No. 10 (16 pages).

Thompson et al., "Concepts and Technologies for a Terabit/s Satellite", The Third International Conference on Advances in Satellite and Space Communications, 2011 (8 pages).

International Search Report—PCT/US2016/013238 dated May 20, 2016—5 pages.

Written Opinion—PCT/US2016/013238 dated May 20, 2016—8 pages.

U.S. Appl. No. 14/597,762—Final Office Action dated Mar. 23, 2017.

* cited by examiner

MODULATION AND CODING FOR A HIGH ALTITUDE PLATFORM

BACKGROUND

Communications platforms include towers, balloons, Unmanned Aerial Vehicles (particularly High Altitude Platforms ("HAPS") and High Altitude Long Endurance ("HALE") platforms), and satellites at low ("LEO"), medium ("MEO") and geostationary ("GEO") Earth orbits. These platforms use directive antennas to form spot beams to provide communication coverage over a specified surface area on Earth referred to as cells. As discussed herein, a cell is a geographical coverage area on the surface of the Earth or in the atmosphere between a communication platform and the area on the surface of the Earth. A spot beam is a radiation pattern of an antenna that illuminates a cell. A surface spectral density (Hertz per square kilometer ("Hz/$km^2$")) within the coverage area is typically increased by increasing the number of radiated spot beams to partition the coverage area into multiple cells and reusing the available spectrum many times. For instance, dividing an area previously covered by one broad beam into 19 cells covered by 19 narrow spot beams and splitting the frequency spectrum into four equal parts (and reusing the spectrum in smaller cells) may result in a surface spectral density that is increased by a factor of 19/4 or nearly five-times. To provide broad and uniform coverage with a high surface spectral density, the telecommunications platform accordingly may use a plurality of antennas such that each antenna is configured to provide similar communication coverage (e.g., a spot beam) to a cell. It is also common practice in satellites to create multiple beams from a single antenna by using more than one duplex feed for each antenna.

In hub-and-spoke networks, also called star networks, communication platforms facilitate communication between at least one gateway station or feederlink station and a plurality of user terminals within a coverage area. The gateway stations are directly connected to the Internet or other local, wide, or geographic computer/television network and configured to provide an Internet/television connection to the user terminals. The communications platforms have at least one feeder link to the gateway station, which is located in one of the cells. The communications platforms convert the forward feeder link uplink signals into forward user link downlink signals provided by the spot beams to user terminals. Similarly, the communications platforms convert user terminal return uplink signals into a return downlink to the gateway station.

Some communications platforms perform demodulation and decoding on each signal received via the feeder link from the gateway station. The signal may include an array of individual baseband packets or time-divided data, which is individually switched by the communications platforms to the appropriate downlink. The communications platforms combine all of the individual baseband packets (or time-divided data) destined for a particular spot beam into a downlink signal, which is coded and modulated for transmission via the spot beam. Some communications platforms also perform the demodulation, decoding, and switching of individual baseband packets (or time-divided data) received in the user terminal return transmissions for transmission to one or more gateway stations, other communications platforms or even other user terminals.

In most communications platforms, however the feeder link with the gateway station uses the same modulation/demodulation and coding/decoding scheme as the links for the user spot beams. Such a configuration is typically optimized for the user terminals because these devices have very low antenna gains and are more frequently subject to fading and noise from environmental factors. This optimization typically includes using modulation and coding schemes that produce relatively more robust links at the expense of being spectrally inefficient, where spectral efficiency is the data rate achieved per unit of spectrum (bps/Hz). If the platform-user terminal link conditions deteriorate due to, for example, heavy rain, an even more robust modulation and coding scheme must be used, thereby further reducing overall system capacity not only on the platform-user terminal link but also on the unimpaired feeder link.

SUMMARY

The present disclosure provides a new and innovative system, method, and apparatus for modulation and coding in a telecommunications platform such as a HAPS, LEO or MEO communications platform to achieve high capacity given the limited allocated frequency resources. The example system, method, and apparatus disclosed herein use a multiplicity of spot beam antennas within the telecommunications platform to illuminate cells within a coverage area. This is necessary to close the user links with sufficient margin to support high data rates and overall system capacity.

The example system, method, and apparatus disclosed herein use a processor within the telecommunications platform to demodulate and decode a feeder link from a gateway station to recover a baseband signal. This enables a different modulation-coding ("MODCOD") mode to be selected for the feeder link that is independent of the MODCOD mode for the user links. Such a configuration of different MODCOD modes enables a spectrally efficient MODCOD mode to be used for the feeder link with the gateway station to improve bandwidth while a different MODCOD mode for the user links carried by the spot beams is optimized for robustness.

The example system, method, and apparatus disclosed herein may use a switch within a telecommunications platform to dynamically share the 47 GHz band spectrum between a Gateway-HAPS uplink and multiple HAPS-user terminal downlinks. On the downlink spectral resources may be shared in either time or frequency or both between various spot beams.

In an example embodiment, a telecommunications platform or transceiver apparatus includes a gateway-link antenna configured to communicate with a ground-based gateway station and a plurality of user-link antennas configured to provide communication coverage among a plurality of terminals within a specified area on the ground. Each user-link antenna is configured to communicate with a specified cell within the specified area. The platform or transceiver apparatus also includes a processor (or circuitry components) configured to demodulate and decode a first set of modulation and coding schemes (e.g., a first MODCOD mode set) used for an uplink feeder link provided by the gateway antenna and apply a second set of modulation and coding schemes (e.g., a second MODCOD mode set) for user links provided in spot beams. The first MODCOD mode set is configured to be relatively more spectrally efficient to provide a better data rate for the feeder link compared to the second MODCOD mode set for the user links.

In another example embodiment, a method to provision a telecommunications apparatus includes determining a first set of modulation and coding schemes (e.g., a first MOD-COD mode set) that is spectrally efficient for a feeder link communicatively coupled to a gateway antenna. The example method also includes determining a second set of modulation and coding schemes (e.g., a second MODCOD mode set) that is robust for user links communicatively coupled to respective user antennas, each antenna being configured to communicate with a specified cell within the specified area. The method further includes provisioning the telecommunications apparatus with the first MODCOD mode set and the second MODCOD mode set.

Additional features and advantages of the disclosed system, method, and apparatus are described in, and will be apparent from, the following Detailed Description and the Figures.

DETAILED DESCRIPTION

The present disclosure relates in general to a method, apparatus, and system to use different modulation/demodulation schemes and coding/decoding schemes within a telecommunications platform. As disclosed herein, the term 'platform' may refer to any Low Earth Orbit ("LEO") satellite, Medium Earth Orbit ("MEO") satellite, Geosynchronous Earth Orbit ("GEO") satellite, and/or High Altitude Platform ("HAP"). A HAP may include any airship, airplane, balloon, etc. operating between, for example, 17 km and 22 km over the surface.

Figure 1:
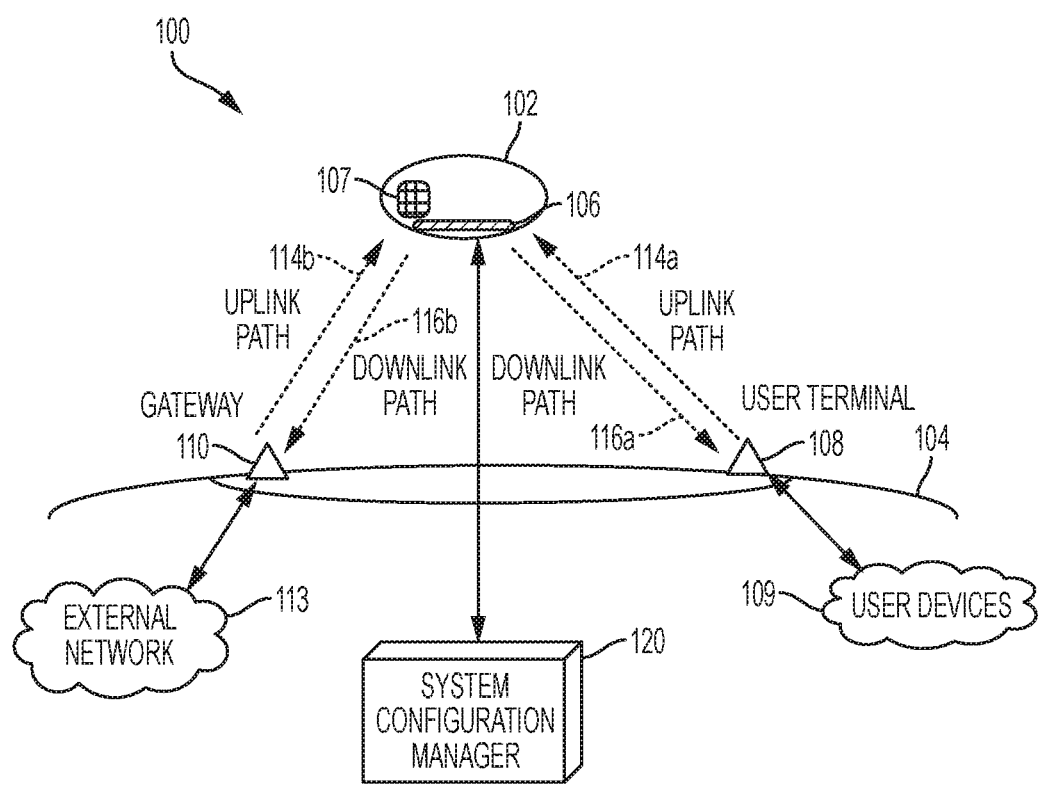
FIG. 1 shows a diagram of an example communication system, according to an example embodiment of the present disclosure.
Figure 2:
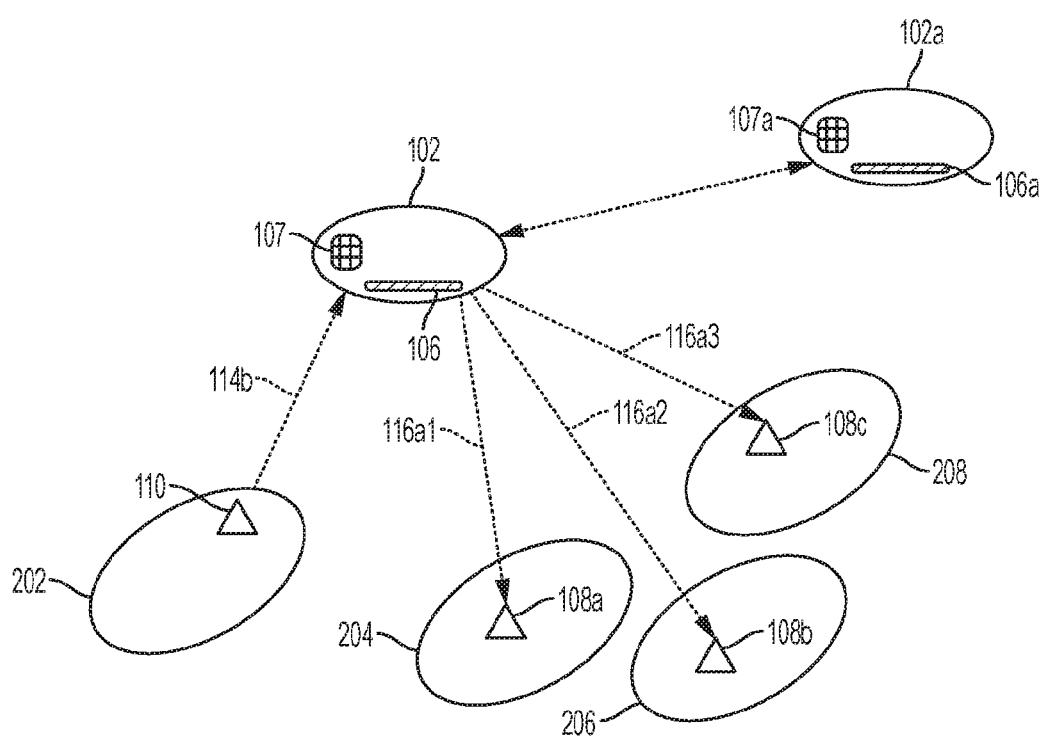
FIG. 2 shows a diagram of the example platform of FIG. 1 routing signals from a gateway station to user terminals via a platform, according to an example embodiment of the present disclosure.

The example method, apparatus, and system disclosed herein are used in conjunction with a high capacity telecommunications platform configured to relay communications between one or more gateway stations and a plurality of user terminals within a specified coverage area as shown in FIGS. 1 and 2. The telecommunications platform is configured with multiple antennas to provide multiple spot beams to respective cells within the coverage area. The telecommunications platform may also be configured for frequency reuse to improve overall system capacity.

In high capacity communication systems, bandwidth is provided by using a large number of gateway stations. The capacity of a telecommunications platform is therefore limited by the number of gateway stations that can be used because each gateway station has a limited spectrum to use for communications with the platform. The use of many gateways stations to increase capacity is problematic because some gateway stations may have to use the same spectrum as the user links if the gateway stations are located in the same areas as the user terminals, thereby creating interference or reducing signal quality. Further, gateway stations are expensive, require high speed access to terrestrial fiber, and need a facility to house a large antenna. It should be appreciated that reducing the number of gateway stations can reduce the overall cost of deploying and operating the ground-segment of the system. However, reducing the number of gateway stations may reduce overall bandwidth capacity.

The telecommunications platform disclosed herein is configured or provisioned to improve (or maximize) the spectrum efficiency for each gateway station link to reduce (or minimize) the required bandwidth to achieve the desired capacity, and therefore reduce the number of gateway stations. The improvement in spectrum efficiency within the example telecommunications platform accordingly reduces system implementation costs and operating costs because fewer gateway stations are needed to maintain capacity for user terminals. Since there are fewer gateway stations than user terminals, the gateway antenna and the radio frequency ("RF") chain at the gateway station can have considerable gain, and thus can support more spectrally efficient modulation/demodulation schemes and coding/decoding schemes (e.g., MODCOD modes or MODCOD mode sets) on both the uplink and downlink between the gateway and the telecommunications platform. This enables more robust modulation/demodulation and coding/decoding schemes (e.g., MODCOD modes or MODCOD mode sets) to be used for the uplinks and downlinks between the telecommunications platform and the user terminals within the spot beams. The more robust MODCOD modes compensate for the smaller antennas (and consequently lower gains) at the user terminals and signal deterioration due to environmental conditions on these links.

It should be appreciated that robust MODCOD modes are necessarily less spectrally efficient than highly efficient MODCOD modes. Spectrally efficient MODCOD modes require higher link quality or signal-to-noise ratio than more robust MODCOD modes which are preferred on links with poor quality or signal-to-noise ratios. The separation of MODCOD modes for gateways stations and user terminals accordingly enables the most optimal MODCOD mode to be used for each communication path without having to sacrifice robustness, quality, or spectral efficiency desired for other communication paths. One benefit of using a more spectrally efficient MODCOD mode for communications between a gateway station and a telecommunications platform is that fewer gateway stations are needed overall to support, for example, a coverage area with 19+ cells having an area over 36,000 km$^2$.

HAPs configured to support communications have been envisioned since the 1970s. However, technology to support high-speed and reliable wireless communication has not become available until recently. Additionally, technology to maintain HAPs within the air for extended periods of time (e.g., HALE) has only recently become available. For instance, the energy density, weight, and size of batteries, fuel cells, and solar cells have become advanced enough to support continuous operation of an airship or blimp in the sky for 30 to 60 days or more.

HAPs have several potential advantages compared to higher altitude satellites. For instance, HAPs generally have a relatively low communication latency in the 100's of microseconds ("µsec") compared to latencies of 100's milliseconds ("msec") for GEO satellites and 10's msec for LEO satellites operating over 500 km. Additionally, HAPs have a shorter product development cycle time compared to satellites, which require space qualification in addition to engineering design that ensures continuous operation for an extended period of time (e.g., ten years). Also, launching a few GEO satellites or a large constellation of LEO satellites can be very expensive and high risk. This means that HAPs may be developed with less upfront capital investment than satellites. HAPs may also be repaired and/or upgraded relatively easily by landing the HAPs for service. In comparison, satellites cannot generally be repaired or upgraded once launched into space.

Further, HAPs may be provisioned one at a time so that a HAP-based communication system can be rolled out to different geographic areas at different times without affecting performance of other HAPs within the system. In contrast to HAPs, satellites are expensive and generally take several years to design, build, qualify, and launch before service can begin. LEO satellite systems also generally require that all satellites be provisioned at the same time to provide system wide coverage.

Another disadvantage of satellites is that there is generally too much capacity provided in low usage areas. Satellites have coverage areas that are relatively large where a sizable portion of the coverage area includes oceans, lakes, deserts, forests, and protected lands that have few (if any) users. Additionally, some LEO satellites spend a significant amount of time orbiting over oceans and other uninhabited areas. Since a sizeable portion of the coverage area (and consequently bandwidth) is provided to sparsely populated areas, satellites have trouble providing enough capacity in relatively small high usage areas where the amount of bandwidth for that area is limited. In contrast, HAPs are deployed where there are large concentrations of users (e.g., cities), thereby providing service where there is the greatest demand/need.

A further disadvantage of satellites is the power and antenna size needed to provide high QoS communications. Satellites are generally thousands of kilometers above the surface, which requires high power output per antenna and larger antenna sizes to maintain acceptable QoS parameters. HAPs in contrast are much closer to the surface (e.g., 17 km to 22 km) and can provide the same (or better) QoS with lower power and smaller antennas.

While the disclosure is not limited to any frequency, certain frequency spectrums have been allocated for HAP communications by regulatory bodies. These allocated frequencies are used in the examples discussed herein. For example, the uplink 214b of FIGS. 1 and 2 may use a frequency band between 31.0 and 31.3 GHz and the downlink 216a may use a frequency band between 27.9 and 28.2 GHz. Additionally or alternatively, both the uplink 214b and the downlink 214b may use a frequency band between 47.2 and 47.5 GHz and 47.9 and 48.2 GHz. In the United States, the allocation includes the entire band between 47.2 and 48.2 GHz. In some instances, the boundary between uplink and downlink may be dynamically adjusted to meet traffic demand. The signals on the two links may use time division duplexing at the HAPs.

In one embodiment the forward downlink from the HAPS to the user terminals may use time hopping of the entire spectrum from one beam to another, dwelling on each beam as required. Another embodiment may divide the available spectrum into frequency channels so that each channel is allocated to a different spot beam. Frequency channels could be reused if the beams are far enough apart. Some combination of frequency and time division sharing of the spectrum between spot beams is also possible. The advantage of this embodiment is that more spectrum is available for the user data links. The disclosure is not restricted to these embodiments of this frequency plan. For instance, in the future, other frequencies may become available to HAP communications. Additionally, if the methods and apparatus of this disclosure are applied to LEO satellites, other spectrum is already available.

The problem for HAPS communications may be magnified because the allocated spectrum at 47 GHz is near the oxygen absorption band between 50.47 and 68.96 GHz. The atmospheric losses due to oxygen absorption can be made up for in a gateway station to HAPS feeder link by increasing the Effective Isotropic Radiated Power ("EIRP") of the gateway station. Unfortunately, the user terminals should be low cost in order to make the HAPS system a competitive system and a sufficiently high antenna gain-to-noise-temperature ("G/T") needed to support high throughput modulation and coding schemes may not be possible. The currently allocated spectrum for HAPS communications requires rethinking how newly evolving technologies are applied. While regulatory authorities are considering additional spectrum for HAPS, there exists competition for spectrum from other types of communications services.

HAP Communication Environment

FIG. 1 shows a diagram of an example communication system 100, according to an example embodiment of the present disclosure. The example communication system 100 includes a platform 102 (e.g., a HAP) configured to operate at a specified altitude above the Earth's surface 104. For instance, the platform 102 may operate between 17 to 22 km above the surface of the Earth. In other examples, the platform 102 may be replaced by any other suitable communications platforms.

The example platform 102 includes antennas 106 in addition to hardware 107 (e.g., receiver, switch, transmitter, modem, router, filter, amplifier, frequency translator computing device, processor, memory/buffer, etc.) to facilitate the relay of communications between user terminals 108 and a gateway station 110. For example, the platform 102 may have a transponder bent-pipe design for relaying communications signals between the gateway 110 and the user terminals 108 in multiple cells. As described below in more detail, the hardware 107 includes processing, switching, and/or routing capability so that circuits may be switched or individual packets may be routed between different cells. The processing also enables different MODCOD modes to be selected for communication with the user terminals 108 and communication with the gateway station 110. The communications signals transmitted to/from the platform 102 can be any combination of standard or proprietary waveforms. Additionally, the gateway station 110 can be connected to any combination of communications networks such as the Internet (e.g., external network 113).

The example hardware 107 includes a switch and/or processor that is configured to retransmit communications received from one cell back to the same cell or another cell. For instance, a switch may be configured to receive communication data from at least one of the gateway station 110 and the user terminals 108 and determine a destination cell within a coverage area for the communication data. The switch then selects one of the plurality of antennas 106 corresponding to the destination cell to transmit the communication data and accordingly transmits the communication data via the selected antenna.

In other embodiments the data could be sent to other HAPS, GEO/LEO satellites, or other aircraft (e.g., the platform 102a of FIG. 2). For instance, the platform 102 may operate within a star or hub-and-spoke network that routes communication data from the gateway station 110 and/or the user terminals 108 to the platform 102a. The second platform 102a determines a destination cell within a respective different coverage area for routing the communication data. In some instances, the platform 102a may transmit the communications data to yet another platform. It should be appreciated that the platform 102 may include a platform antenna aligned with the platform 102a to establish and maintain one or more (forward and return) feeder links to facilitate the transmission of the communication data. In other embodiments, a gateway or user antenna may be used.

The example user terminal 108 can be any terminal capable of communicating with the platform 102. The user terminal 108 includes an antenna, transceiver, and processor to facilitate the transmission of data with the platform 102. The user terminals 108 may be connected to any user communications equipment or device such as a router, switch, phone or computer 109. The user terminal 108 may also include a mobile platform such as a vehicle, ship, or aircraft. While FIG. 1 shows one user terminal 108, it should be appreciated that the platform 102 is configured to communicate with a plurality of user terminals within a coverage area.

The example gateway station 110 includes any centralized transceiver connected to the network 113 (e.g., the PSTN, Internet, a LAN, a virtual LAN, a private LAN, etc.). The gateway station 110 may include one or more base stations, antennas, transmitters, receivers, processors, etc. configured to convert data received from the network 113 into signals for wireless transmission to the platform 102 and convert data received from the platform 102 into signals for transmission to the network 113. In some instances, the platform 102 may be in communication with more than one gateway station 110 (which may require a separate gateway antenna pointed at each station). Additionally or alternatively, the gateway station 110 may be in communication with more than one platform 102. In these instances, the gateway station 110 may select which platform 102 is to receive the data based on, for example, a destination of the data.

The example user terminals 108 and the gateway station 110 are configured to communicate with the platform 102 via uplinks 114 downlinks 116. The links 114 and 116 use spot beams provided by the platform 102 to cover specified cells containing the user terminal 108 and/or the gateway station 110. It should be appreciated that a spot beam may multiplex a plurality of signals on each uplink 114 and each downlink 116 based on the amount of user terminals 108 and/or gateway stations 110 transmitting or receiving data within a cell.

As shown in FIG. 1, data is transmitted to the platform 102 from the user terminals 108 via the uplink 114a and data is received from the platform 102 at the user terminals 208 via the downlink 116a. Similarly, data is transmitted to the platform 102 from the gateway station 110 via the uplink 114b and data is received from the platform 102 at the gateway station 110 via the downlink 116b. The uplink 114b and the downlink 116b are referred to herein as the forward link (that carry forward link user data and management and control signals) between the gateway station 110 and the user terminals 108. The uplink 114a and the downlink 116a are referred to herein as return links (that carry return link user data or management and control signals) between the user terminals 108 and the gateway station 110. The downlinks 116b and the uplinks 114b together comprise the feeder link(s) and the downlinks 116a and the uplinks 114a together comprise the user links.

The gateway station 110 sends communication signals to platform 102 via a forward feeder link comprising the uplink 114b. The hardware 207 at the platform 102 demodulates and decodes the forward feeder link signals so that individual packets or time-divided portions may be routed to a buffer for a corresponding spot beam. For each spot beam buffer, the individual packets or time-divided portions are multiplexed or combined into a forward user spot beam signal, which is coded and modulated. The platform 102 transmits the modulated forward user spot beam signal via a forward user spot beam comprising the downlink 116a.

The user terminal 108 sends communications signals to the platform via a return user spot beam signal included within a spot beam comprising the uplink 114a. The hardware 207 at the platform 102 demodulates and decodes the return user spot beam signals so that individual packets or time-divided portions may be routed to a buffer for a link to a gateway station. For each link to a gateway station, the individual packets or time-divided portions are multiplexed or combined into a return feeder link signal, which is then coded and modulated. The platform 102 transmits the modulated return feeder link signal to the gateway station 110 via a return feeder link comprising the downlink 116b.

As described in more detail below, the signals transmitted along the uplink 114b and the downlink 116b between the gateway station 110 and the platform 102 are modulated/demodulated and/or coded/decoded to increase spectrum efficiency while the signals transmitted along the uplink 114a and the downlink 116a between the user terminal 108 and the platform 102 are differently modulated/demodulated and/or coded/decoded to increase robustness.

The example platform 102 includes separate antennas 106 (or apertures and feeds) for each spot beam and each link or beam to a gateway station. For example, the platform 102 may include four port feeds for gateway stations and two port feeds for spot beams. The port feeds may include dual polarization (e.g., left hand circular polarization ("LHCP") and right hand circular polarization ("RHCP"). In this example, the return link 114a is converted to baseband, processed, and multiplexed at the platform 102. The multiplexed signal is then transmitted via return link 116b to the gateway station 110. The user terminal 108 may handoff from one spot beam to another as the beams move across the Earth's surface, which is conducive to a user terminal which can transmit and receive both polarizations. Similarly the forward link 114b is converted to baseband, processed, and multiplexed at the platform 102. The multiplexed signal is then transmitted in a spot beam via the forward link 116a to the user terminal 108. A gateway antenna 106 on board the platform 102 is configured to be constantly pointed toward the gateway station 110 despite any changes to the platform's pitch, roll, yaw, and position. The gateway antenna 106 may be mechanically or electrically controlled and/or moved to remain aligned with the gateway station 110.

FIG. 2 shows a diagram of the example platform 102 of FIG. 1 routing signals from the gateway station 110 to three user terminals 108a to 108c, according to an example embodiment of the present disclosure. In this example, the gateway station 110 is located in cell 202, user terminal 108a is located in cell 204, user terminal 108b is located in cell 206, and user terminal 108c is located in cell 208. The platform 102 provides each of the cells 202 to 208 a respective spot beam.

Figure 3:
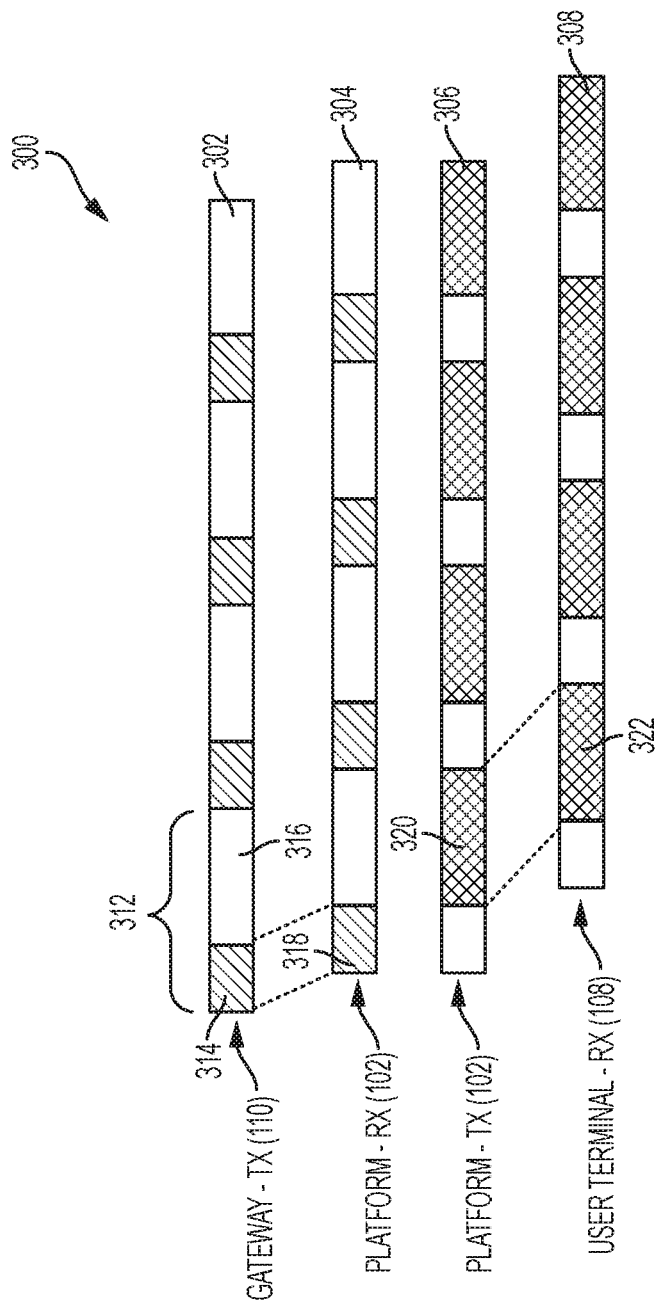
FIG. 3 shows a timing diagram of signals transmitted to and from the example platform of FIGS. 1 and 2, according to an example embodiment of the present disclosure.
Figure 3A:
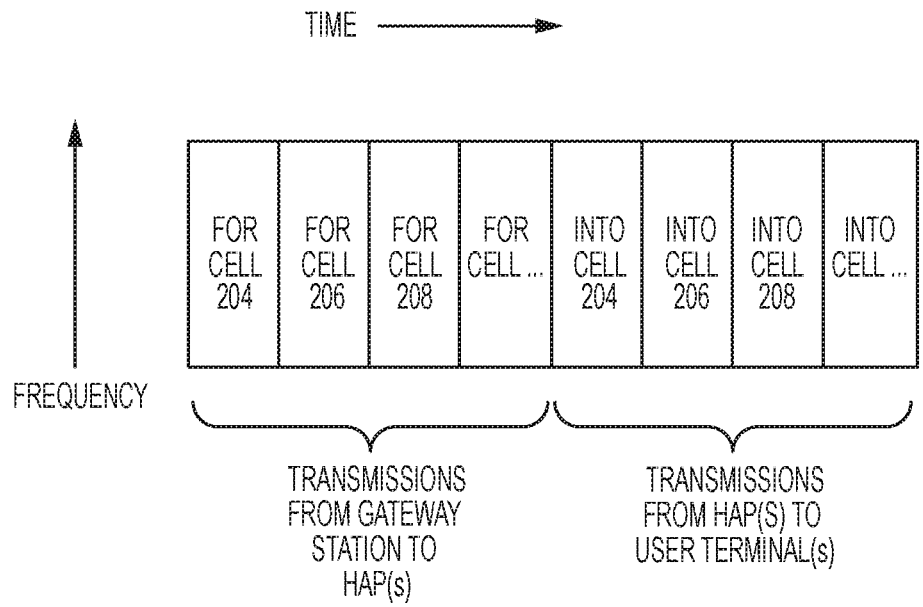
FIG. 3A shows a timing and frequency diagram where full bandwidth is used for by the platform of FIG. 2 for each user terminal link by time hopping a forward downlink signal between spot beams or cells, according to an example embodiment of the present disclosure.
Figure 3B:
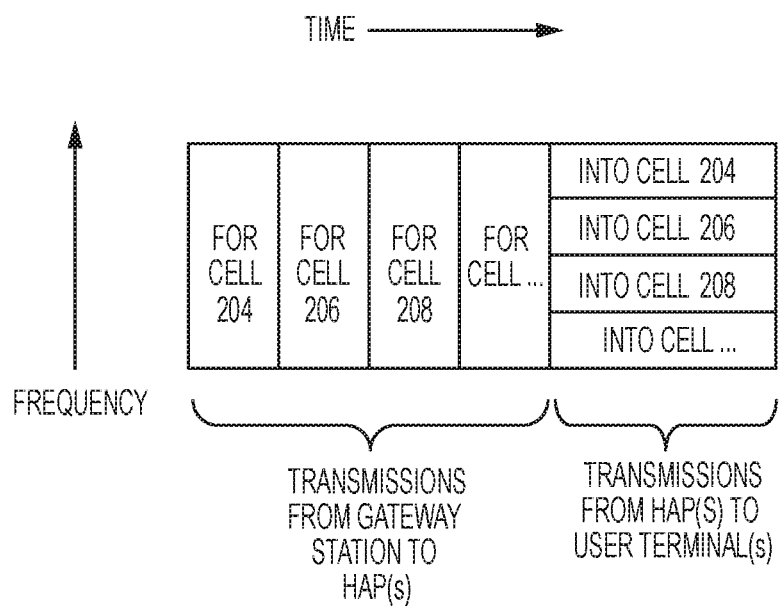
FIG. 3B shows a timing and frequency diagram where frequency division is used by the platform of FIG. 2 to serve all of the forward downlinks between cells, according to an example embodiment of the present disclosure.
Figure 4:
FIGS. 4 to 7 show diagrams of respective tables illustrating bandwidth information in relation to values for transmission duration α for the example platform of FIGS. 1 and 2 in communication with one, two, three, and four gateways stations, according to an example embodiment of the present disclosure.

While this disclosure is not limited to any frequency, certain frequency spectrums have been allocated for HAP communications by regulatory bodies, as discussed above. These allocated frequencies are used in the example discussed herein. The example embodiment disclosed herein assumes the downlink 116b of FIGS. 1 and 2 may use a frequency band between 31.0 and 31.3 GHz and the uplink 114a may use a frequency band between 27.9 and 28.2 GHz. Additionally, both the uplink 114b and the downlink 116a may use a frequency band between 47.2 and 47.5 GHz and 47.9 and 48.2 GHz. In the United States, the allocation includes the entire band between 47.2 and 48.2 GHz. The time-division boundary between forward uplink and forward downlink may be dynamically adjusted to meet traffic demand. As shown in FIG. 3, the signals on the two links may use time division duplexing at the platform 102. Time Division Duplexing is required because a frequency division duplex of the 47 GHz band would result in a low level received signal from the gateway station 110 being interfered with by a high level transmitted signal from the platform 102 towards the user terminals 108. There is not enough separation in frequency to be able to implement a suitable duplex filter. As shown in FIG. 3A, in one embodiment the forward downlink from the platform 102 to the user terminals 108 uses time hopping of the entire spectrum from one beam to another, dwelling on each beam as required. The dwell time for each beam can be dynamically adjusted depending on the amount of traffic towards each beam. As shown in FIG. 3B, in another embodiment the available spectrum is divided into frequency channels so that each channel would be allocated to a different spot beam. Frequency channels could be reused if the beams are far enough apart. Some combination of frequency and time division sharing of the spectrum between spot beams is also possible. The disclosure is not restricted to this frequency plan and in the future other frequencies may become available to HAP communications.

Returning to FIGS. 1 and 2, the gateway station 110 transmits forward feeder link signals along the uplink 114b to the platform 102. The forward feeder link signals may include, for example, a 16 phase-shift keying ("PSK") modulation scheme and 3/4 forward error correction ("FEC") mode. The hardware 107 at the platform 102 separates the individual data packets or time-portions within the forward feeder link signals. The separated data packets or time-portions are then switched to the appropriate spot beam for the respective cells 204 to 208 based on a destination (e.g., the user terminal 108). The platform 102 transmits forward user spot beam signals via the respective downlinks 116a1, 116a2, and 116a3 to the cells 204 to 208. The forward user spot beam signals may use, for example, a Quadrature-PSK ("QPSK") modulation scheme and 1/2 FEC mode, which is more robust to thermal noise than the 16-PSK modulation scheme proposed for the uplink from the gateway station 110 to the platform 102.

The example gateway station 110 uses the same spectrum along the uplink 114b as each of the three spot beams along the downlinks 116a. However, the gateway station 110 can transmit three times the data in the same time because the 16 PSK modulation 3/4 FEC mode is more spectrally efficient. Specifically, the uplink 114b has a spectral efficiency of 2.7 (bits/second)/Hertz ("b/s/Hz") while the downlinks 116a each have a spectral efficiency of 0.9 b/s/Hz. The tradeoff is that the 16 PSK modulation 3/4 FEC mode requires 12 dB of $E_s/N_o$ (energy per bit to noise power spectral density ratio) while the QPSK 1/2 FEC mode requires an $E_s/N_o$ of only 1.5 dB. However, this tradeoff is acceptable because only the one gateway station 110 needs to be deployed to serve the traffic for the three spot beams corresponding to cells 204 to 208. Further, the gateway station 110 may compensate for the difference signal-to-noise ratio requirement of about 10.5 dB with a larger antenna or power amplifier. It should be appreciated that a larger antenna or power amplifier cannot be added to the user terminals 108 (which are constrained by portability or size) to compensate for higher signal-to-noise ration losses, which is why a more robust MODCOD mode is used for those signals.

As discussed, the example embodiment assumes the uplink 214b of FIGS. 1 and 2 may use a frequency band between 47.2 and 47.5 GHz, the downlink 216b may use a frequency band between 47.9 and 48.2 GHz, the uplink 214a may use a frequency band between 31.0 and 31.3 GHz and the downlink 216a may use a frequency band between 27.9 and 28.2 GHz. Another possible embodiment assumes the uplink 214b may use a frequency band between 31.0 and 31.3 GHz and the downlink 216a may use a frequency band between 27.9 and 28.2 GHz and both the uplink 214b and the downlink 214b may use a frequency band between 47.2 and 47.5 GHz and 47.9 and 48.2 GHz. The advantage of the first embodiment is that rain attenuation on the user links are easier to close with higher data rates. The advantage of the second embodiment is that more spectrum is available for the user data links. The disclosure is not restricted to either of these frequency plans and in the future other frequencies may become available to HAP communications.

In some embodiments, the antennas 106 of the example platform 102 are configured to have different sizes (e.g., different size apertures), as disclosed in U.S. patent application Ser. No. 14/510,790, filed Mar. 5, 2015, the entirety of which is incorporated herein by reference. The different size antennas 106 are used to create cells of substantially the same size in order to achieve a constant surface spectral density throughout the coverage area. The differently sized antennas 106 provide corresponding different size beam widths, which compensates for the angle at which Earth subtends at 17 km to 22 km resulting in substantially similarly sized cells. Such a configuration of differently sized antennas maintains a consistent QoS or available bandwidth throughout the cells of a coverage area so that a user does not experience service degradation when the user terminal 108 moves between cells and/or the platform 102 moves relative to a user terminal. To maintain consistent cell areas, antennas covering the outer cells are relatively larger (and consequently have more gain) than those antennas coving the interior cells. The increased gain for the antennas covering the outer cells compensates, in part, for the increased path loss from the greater distance to reach those outer cells. Further, the consistent cell sizes means that link margins between user terminals 108 and the platform 102 are similar, which means that antennas on the user terminals can be the same regardless of the location of the user terminal within the coverage area.

Returning to FIG. 1, the example communication system 100 also includes a system configuration manager 120, which may comprise any processor or system tasked with designing, developing, and/or maintaining the antennas 106, hardware 107, and other features of the platform 102. The system configuration manager 120 may determine a coverage area to be serviced by the platform 102 in addition to a number of antennas needed to provide acceptable bandwidth to user terminals and the size of the antennas to maintain spectral density uniformity among the cells. The system configuration manager 120 may also select the type of antenna 106 including, for example, a reflector, array, open ended waveguide, dipole, monopole, horn, etc. The system configuration manager 120 may select the antenna type based on, for example, a desired spot beam size, bandwidth, gain, elevation angle relative to the surface, etc. The system configuration manager 120 may also select the size of the aperture of the antenna 106 based on the desired spot beam size, bandwidth, gain, elevation angle, etc. In some instances, the system configuration manager 120 may include a control link to configure the platform 102 based on a new set of coverage area and QoS parameters. Depending on the capability of the platform 102, such parameters may include new frequency assignments, new spot beam forming coefficients or new routing tables.

The example system configuration manager 120 may also determine the MODCOD modes for the platform 102. For instance, the manager 120 may determine spectrally efficient MODCOD modes for the links 114b and 116b communicatively coupling to the gateway station 110 to the platform 102. The manager 120 may also determine more robust MODCOD modes for user links 114a and 116a. Alternatively, the MODCOD modes used on these links may be selected dynamically (or varied) to match current link conditions as these change by a processor on-board the platform 102 or in each terminal. The configuration manager 120 may provision the hardware 107 on the platform 102 for the range of MODCOD modes to be used on each of these links. Provisioning may include, for example, programming one or more processors, tuning/configuring/selecting appropriate amplifiers, analog-to-digital converters ("ADC"), demodulators/modulators, coders/decoders, buffers, down-converters ("DCs or DoCos"), and up-converters ("UCs or UpCos") compatible for each MODCOD mode and/or frequency.

In addition to configuring the platform 102, the example system configuration manager 120 may also service and/or maintain the platform 102. For example, the system configuration manager 120 may transmit software updates while the platform 102 is operational in the sky. The system configuration manager 120 may also instruct the platform 102 to move to a new geographical location. The system configuration manager 120 may further instruct the platform 102 to return to the ground for maintenance, upgrades, service, antenna reconfiguration, etc. The system configuration manager 120 may communicate with the platform 102 via the gateway 110 and/or a proprietary/private communication link. In some instances, the platform 102 may provide diagnostic and status information to the system configuration manager 120 via the proprietary/private communication link and/or through the gateway 110 multiplexed with communications traffic.

Modulation and Coding Embodiments

The example hardware 107 of the platform 102 is configured to slice or partition signals from the user terminals 108 and the gateway station 110 based on a format of the signals. For example, a data stream or signal provided in the forward feeder link 114b from the gateway station 110 may be time-sliced by the hardware 107 within the platform 102 based on a number of cells or spot beams. For instance, gateway station 110 in the embodiment of FIG. 2 may partition a signal into three portions, one for each of the cells 204, 206, and 208. The partition may be at fixed time boundaries such that each cell is allocated 1/3 of the bandwidth. The hardware 107 at the platform 102 is configured to partition the signal at the fixed time boundaries and route or switch each partitioned portion to the appropriate cell 204 to 208.

Alternatively, the data stream or signal from the gateway station 110 may be configured such that the partition for each of the cells 204 to 208 is dynamic. Such a configuration enables a larger portion to be allocated for a cell with higher bandwidth needs. A control signal or codeblock may be provided by the gateway station 110 to the platform 102 indicative of the timing for the portions. The control signal (or codeblock) may be provided in-band or out-of-band.

In yet another embodiment, the data stream or signal from the gateway station 110 may include individual data packets, which are configured to be processed individually by the platform 102. For instance, hardware 107 (including hardware controlled by software or machine readable instructions) may be configured to determine a cell identifier within a header of the packet, which is used for routing the packet to the appropriate cell 204 to 208. The hardware 107 may include, for example, a switch or router implemented at the media access control ("MAC") layer or the network layer. This MAC address may indicate the appropriate user terminal and/or the spot beam in which the user terminal resides.

The example platform 102 is also configured to combine portions or signals or data packets into a signal or data stream for the return feeder link 116b to the gateway station 110. For instance, the hardware 107 at the platform 102 may be configured to determine which gateway station 110 a signal from a user terminal 108 is to be routed using, for example, a time-based approach or packet-based approach. The hardware 107 combines packets or signal portions from the different cells 204 to 208 that all have a destination (or intermediate destination) of the gateway station 110.

It should be appreciated that the time-division duplexing ("TDD") and packet routing embodiments discussed above enables incremental additions of gateway stations without any impact to the user terminals. For example, gateway stations may be added to the system as bandwidth demand increases without affecting the timing scheme for routing or switching signals among the cells within a coverage area. The TDD and packet routing methods are conducive to the modulation-demodulation performed by the platform 102. The time division duplex scheme of sharing the total bandwidth between the forward uplink signals on links 114b and the forward downlink signals on links 116a is independent of the propagation times and may be implemented on the longer paths associated with GEO and/or LEO satellites if the spectrum allocation is similarly constrained FIG. 3 shows a timing diagram 300 of signals transmitted to and from the platform 102 of FIGS. 1 and 2, according to an example embodiment of the present disclosure. The example timing diagram 300 includes transmission pattern 302, 304, 306, and 308 for signals transmitted from the gateway station 110 to the user terminal 108. Each of the transmission patterns 302 to 308 have the same frame period 312 having a fixed duration. The frame period duration may be, for example, 100 ms. The shaded areas within each of the patterns 302 to 308 designate active times of the frame period 312. The clear or white areas within each of the patterns 302 to 308 designate inactive times of the frame period 312 for the associated link. The shaded areas may have a duration of 1-α ms and the clear areas may have a duration of α ms on the link 114b. The time reference may be at the gateway station 110 or the platform 102. Additionally, the platform 102 may actively or passively synchronize the transmission patterns with the user terminals 108 and the gateway station 110.

As shown in FIG. 3, the gateway station 110 transmits a signal or data stream during time period 314 and is inactive during time period 316. The platform 102 receives the transmitted signal or data stream during time period 318, which has the same duration as the time period 316. It should be noted that the transmission pattern 304 has a time offset from the transmission period 302 due to signal propagation delays. In other words, the signal received at the platform 102 has a time offset from the signal transmitted by the gateway station 110 due to signal propagation delays. It should be noted that during the time the platform 102 is receiving the signal from the gateway station 110, the platform 102 is not transmitting signals to the user terminal 108. This configuration eliminates interference at the platform 102 from the forward downlinks 116a into the forward uplinks 114b even though they use the same frequency spectrum.

The platform 102 accordingly transmits during time period 320 at least a portion of the signal received during time period 318. During the time period 320 the platform 102 does not receive signals from the gateway station 110. The user terminal 108, which has a time offset from the platform 102 due to signal propagation delays, receives the signal during time period 322. As illustrated in FIG. 3, regardless of propagation time, the signals received from the gateway station 110 and the signals transmitted towards the user terminals 108 using the allocated spectrum between 47.2 and 48.2 GHz cannot overlap in time at the platform 102.

In an example embodiment, the value of α, which is the ratio of i) the time duration for transmission from the platform 102 to the user terminals 108 in relation to ii) the frame time, can be determined by the following equation:

$$\alpha = \frac{\xi_f \cdot N}{\left(\xi_f \cdot N + \xi_u \cdot \frac{n}{r}\right)}$$

In the above equation, N is the number of gateway stations, n is the number of cells or spot beams, r is the frequency reuse factor, $\xi_f$ is the spectral efficiency of the signal transmitted from the gateway station 110 to the platform 102 on the link 114b, and $\xi_u$ is the spectral efficiency of the signal transmitted from the user terminal 108 to the platform 102 on the link 116a.

In an example embodiment, 600 MHz of spectrum between 31.0 and 31.3 GHz (with 2× polarization reuse) is allocated to the user terminals 108 for the return uplink 114a. The user terminals 108 time share with the gateway station 110 1200 MHz of spectrum at the 47 GHz frequency (using the 600 MHz international allocation with 2× polarization reuse) in the forward downlink 116a. The gateway station 110 is configured to use 600 MHz of spectrum between 27.9 and 28.2 GHz (with 2× polarization reuse) for the downlink 116b. The gateway station 110 time shares with the user terminals 108 the 1200 MHz of spectrum at the 47 GHz frequency in the forward uplink 114b. The time sharing is accomplished using the configuration described in conjunction with FIG. 3 and using the forward downlink multiplex shown in either FIG. 3A or FIG. 3B.

In this embodiment, the coverage area of the platform 102 is 36,000 km², assuming a 10 degree elevation angle limitation from a perspective of the user terminal 108 at the edge of the coverage area and a 20 km elevation of the platform 102. The 600 MHz allocated for the user terminals 108 is spread over the 36,000 km² area producing a spectral density of 16.7 kHz per km². The spectral density may be increased by increasing the number of spot beams or cells. For instance, using 19 cells and a spectral reuse of 4 can increase the capacity by approximately a factor of four.

FIGS. 4 to 7 show diagrams of respective tables 400, 500, 600, and 700 illustrating bandwidth information in relation to values for transmission duration α for the example platform 102 in communication with one, two, three, and four gateways stations, according to an example embodiment of the present disclosure. The bandwidth information (units in MHz) is based on the above example embodiment and includes total bandwidth capacity for the user terminals 108, bandwidth capacity for each link with a gateway station 110, bandwidth per each cell or spot beam, and bandwidth per km². As illustrated, as the number of gateway stations increases, the total bandwidth for the spot beams increases in conjunction with bandwidth per cell and bandwidth per km². Additionally, the transmission time duration 1-α decreases in line with the bandwidth for each feeder link to a gateway station. In other words, adding gateways stations reduces the amount of bandwidth any one gateway station has to provide, thereby reducing the time needed for transmission.

Figure 5:
Figure 6:
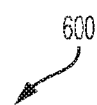
Figure 7:

The example tables 400 to 700 show how the bandwidth information and α duration changes as different MODCOD modes are used for the feeder link between the gateway station 110 and the platform 102. In the example shown in table 400 of FIG. 4, both the gateway station 110 and the user terminal 108 are configured to transmit with a (or using a) MODCOD mode including QPSK modulation and 1/2 FEC. This MODCOD mode is relatively more robust and selected more for the user terminals. In the example shown in the table 500 of FIG. 5, the MODCOD mode for the feeder link with the gateway station 110 is made more spectrally efficient compared to the example in FIG. 4 while the MODCOD mode for the user terminals remains unchanged. The MODCOD mode for the gateway station 110 shown in FIG. 5 is three times more spectrally efficient than the MODCOD mode of FIG. 4. As shown in FIG. 5, the portion of the 1200 MHz forward signal allocated for the user terminals 108 more than doubles compared to the example of FIG. 4. For a single gateway station, the available bandwidth increases from 27 to 761 kHz/km². It should be noted that because of the way the feeder links share bandwidth with the user links the capacity gains become less as more gateway stations are added. For instance, four gateway stations support less than twice the capacity in table 500 compared to table 400.

The example table 600 shows bandwidth information and α for a MODCOD mode that includes 64PSK modulation and 4/5 FEC. The example table 700 shows bandwidth information and α for a MODCOD mode that includes 256PSK modulation and 13/18 FEC. These tables 600 and 700 shows that as spectral efficiency is further increased on the feeder link between the gateway station 110 and the platform 102, the throughput of the entire system in also increased. It should be appreciated the examples shown in tables 400 to 700 are non-limiting and that virtually any spectrally efficient MODCOD mode (or set of MODCOD modes) may be used for the feeder link.

Platform Processor Embodiment

Figure 8:
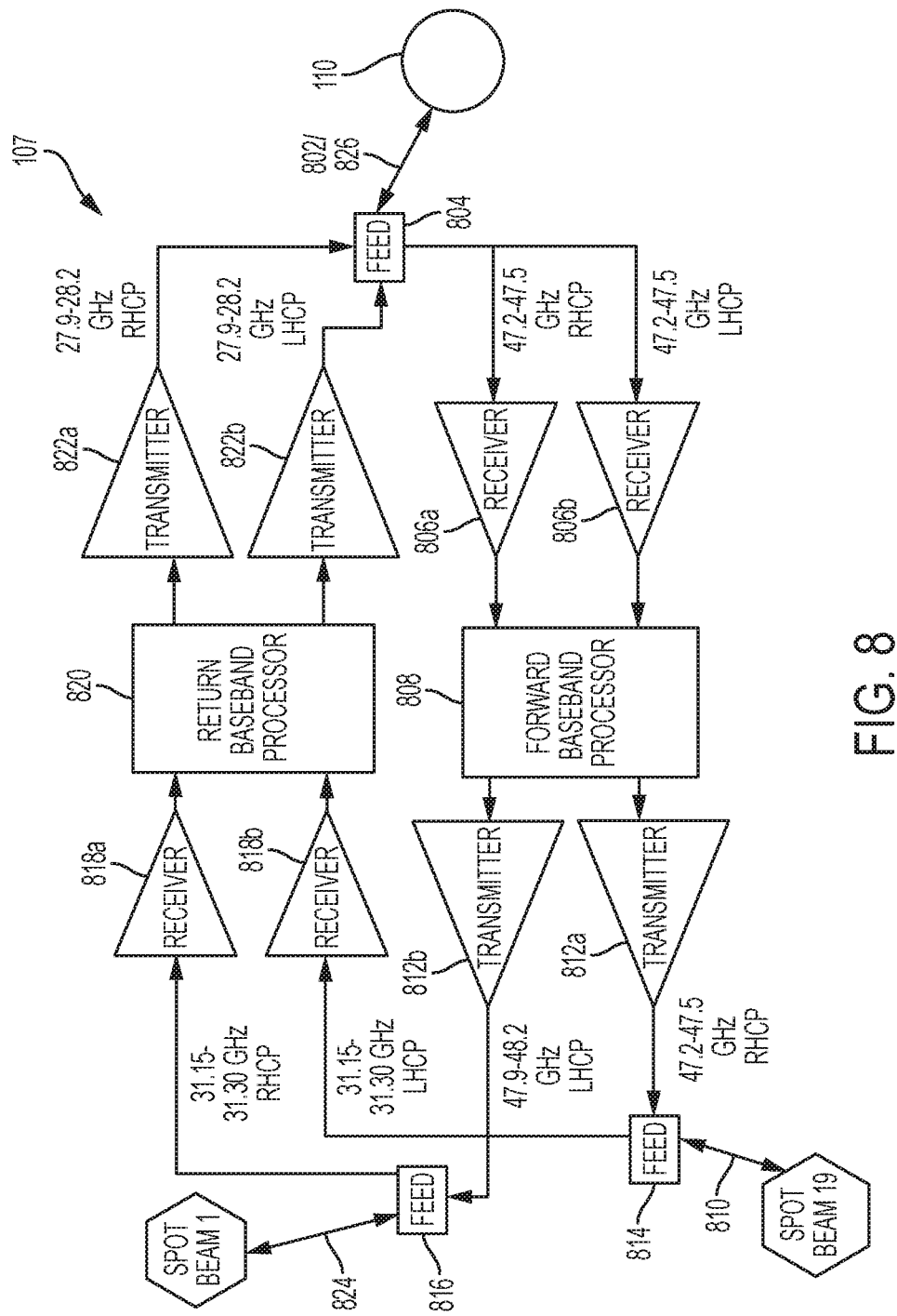
FIGS. 8 to 10 show diagrams of at least a portion of the hardware of the example platform of FIGS. 1 and 2, according to an example embodiment of the present disclosure.
Figure 9:
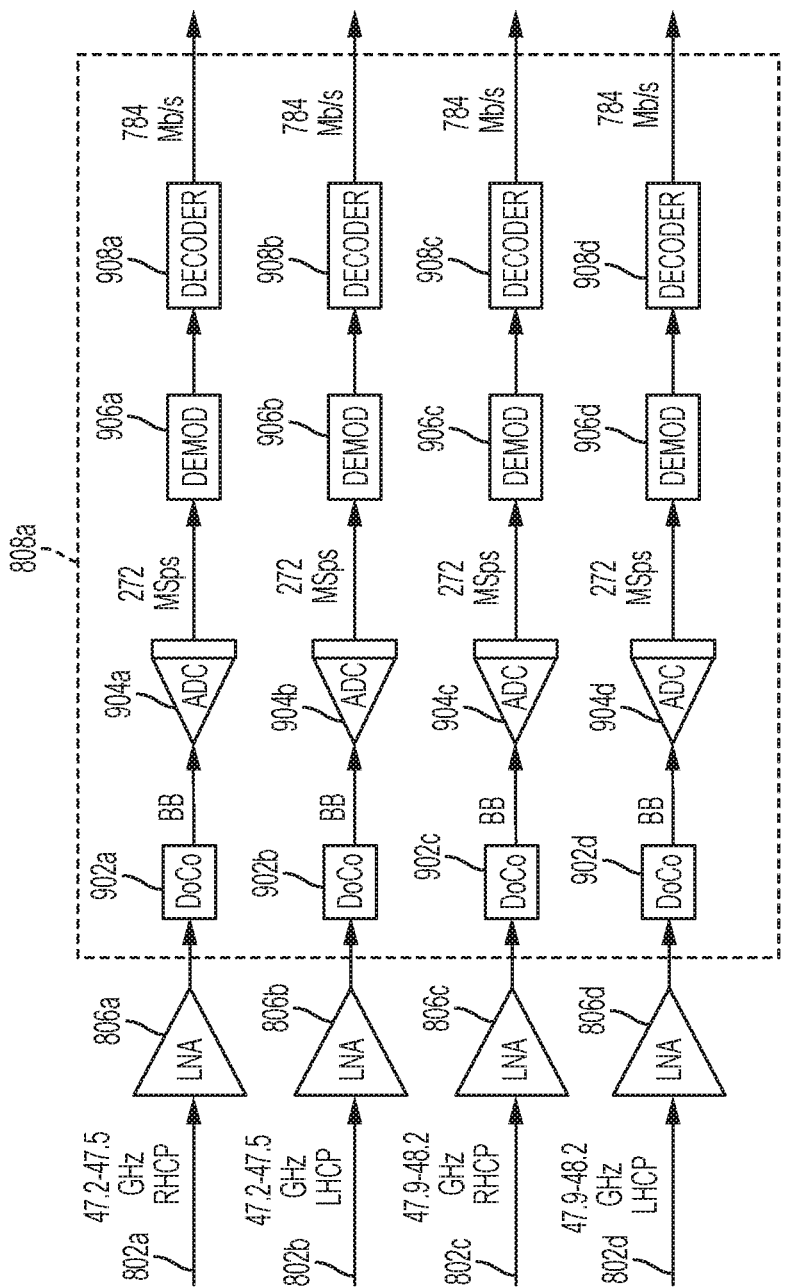
Figure 10:
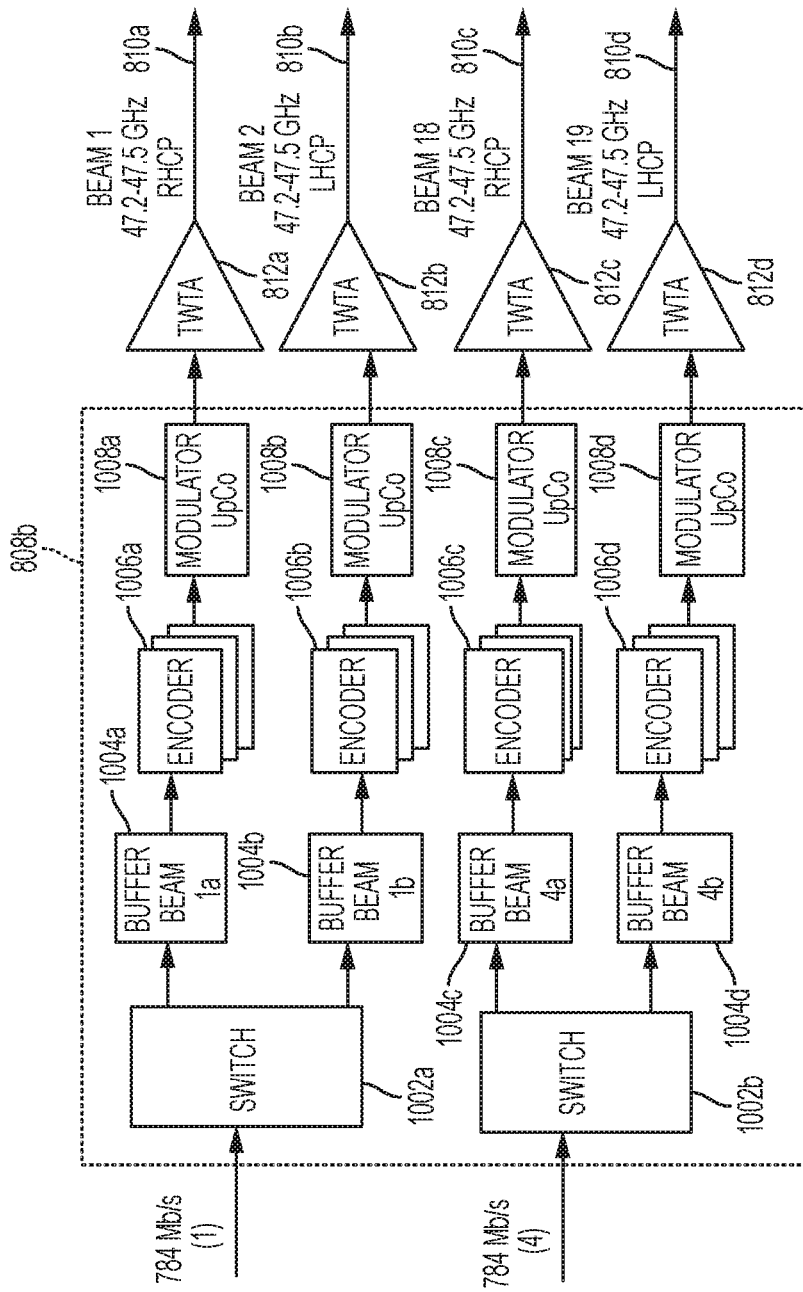

As discussed above, to use different modulation schemes and coding schemes on the feeder links and the user links, the example platform 102 includes hardware 107. FIGS. 8 to 10 show a diagram of at least a portion of the hardware 107, according to an example embodiment of the present disclosure. The example shown in FIG. 8 illustrates processing for receiving only one 47 GHz band. Other examples may include processing for receiving the 47.9 to 48.2 GHz band, such as the example shown in FIG. 9. It should be appreciated that the example shown in FIG. 8 is non-limiting and the hardware 107 may include additional, fewer, or different components.

In the illustrated example of FIG. 8, a forward feeder link signal 802 is transmitted from the gateway station 110 to the platform 102 during the (1-α) duration. The signal 802 may be provided by the uplink 114b of FIGS. 1 and 2. A feed 804 (e.g., the antenna 106) at the platform 102 routes the received signal 802 to one of the receivers 806 based on a polarization of the signal. As shown in FIG. 9, the receivers 806 may include low-noise amplifiers ("LNAs"). A baseband processor 808 is configured to demodulate, decode, and de-multiplex the signal 802 during the time period having the (1-α) duration. The baseband processor 808 also switches or routes the de-multiplexed individual packets or signal portions to the appropriate buffer of a cell or spot beam signal. As discussed above, the routing or switching may be time-based or address-based. The baseband processor 808 then codes and modulates the buffered packets or signal portions into a spot beam signal 810 for transmission during the time period having the a transmission duration. Transmission into the appropriate spot beam (e.g., spot beam 19) includes sending the signal 810 to transmitter 812 and feed 814 (including the antenna 106).

The example hardware 107 also includes receivers 818, return baseband processor 820, and transmitters 822 for processing return signals originating at the user terminals 108. For example, the feeds 814 and 816 are configured to receive return user spot beam signals 810 and 824 having a frequency in the 31.0 to 31.3 GHz band. FIG. 8 shows the hardware 107 for receiving right and left polarized signals in the 31.15 to 31.30 GHz band. The receivers 818 amplify the signal 824 for processing by the return baseband processor 820. As discussed above, processing includes demodulating, decoding, and de-multiplexing. The processing also includes routing or switching individual packets or signal portions to the appropriate gateway station buffer and multiplexing the packets or signal portions within each buffer into a return feeder link signal 826. The processor 820 codes and modulates the signal 826 for transmission, via transmitter 822 and feed 804, to the gateway station 110.

FIG. 9 shows a diagram of a front-end of the forward baseband processor 808a of FIG. 8, according to an example embodiment of the present disclosure. In this illustrated example, the baseband processor 808a receives signals transmitted by the gateway 110 within the two 47 GHz bands using both polarizations. In some instances, it may be possible to receive both bands using one amplifier 806 per polarization.

As shown in FIG. 9, the example front-end of the baseband processor 808a includes a down converter ("DoCo") 902 configured to down-convert the received forward feeder link signal 802 into a baseband ("BB") signal for locale transmission and processing. An ADC 904 converts the baseband analog signal into a digital signal, which is then demodulated via demodulator 906. In this illustrated example, the ADC 904 has a 272 Msps sample rate based on the 300 MHz bandwidth forward feeder link signal 802. A decoder 908 is configured to decode the demodulated signal. The embodiment of FIG. 9 is configured for a modulation of 256 PSK and a 0.55 FEC. In this example, the decoded signal is provided at a rate of 784 Mb/s, which is equal to the 272 Msps sample rate multiplied by 0.55 FEC and a 5.25 decode factor.

FIG. 10 shows a diagram of a back-end of the forward baseband processor 808b of FIG. 8, according to an example embodiment of the present disclosure. The signal having a rate of 784 Mb/s transmitted from the front-end of the baseband processor 808a in FIG. 9 is received at respective switches 1002 in FIG. 10. For clarity, only two of the switches 1002 are shown. The example switches 1002 are time-based switches configured to connect the decoded forward feeder link signal 802 to a downlink user spot beam. The example illustrated in FIG. 10 shows each of the switches 1002 being connected to two spot beam downlink feeds. However, it should be appreciated that each switch may be connected to each spot beam downlink feed (or feed to another platform).

The example switches 1002 are configured to switch the decoded signal 802 based on a fixed or variable time plan. For instance, a time plan may specify that the switch 1002 is to route a first portion of the signal 802 to buffer 1004a and a second subsequent portion of the signal 802 to buffer 1004b. In instances where the time division is variable between the signal portions, the switch 1002 may be instructed using in-band and/or out-of-bands received from, for example, the gateway 110 and/or the system configuration manager 120.

The buffers 1002 within the example back-end baseband processor 808b are configured to queue portions of the signal 802 destined for the same spot beam, thereby forming the forward spot beam signal 810. The buffer 1004 may be configured to store portions of the signal 802 for an entire uplink transmission having a duration of (1-α) if the decoder 908 is capable of operating in real time. Otherwise, the buffer 1004 may be configured to store less data at the expense of also needing a buffer in the front-end of the baseband processor 808a.

The example back-end of the baseband processor 808b includes an encoder 1006 to encode the forward spot beam signal 810 based on a specified FEC. The baseband processor 808 may include a separate encoder for each supported MODCOD mode. The processor 808b also includes a modulator 1008 to modulate the forward spot beam signal 810 based on a specified modulation scheme. The processor 808b further includes an up-converter configured to up-convert a baseband format/frequency of the forward spot beam signal 810 into a desired frequency (e.g., the 47.2 to 47.5 GHz band) for HAP or satellite. In some instances, the up-converter and the modulator may be the same component or included within the same packaging. The processor 808 may include a separate modulator for each supported MOD-COD mode. The selection of the downlink encoder 1006 and/or modulator 1008 may be made by the gateway station 110, the user terminals 108, and/or the processor 808 either statically or based on propagation conditions. For example, detection of heavy rain in a cell may cause an encoder and modulator to be selected that supports very robust communications. In some instances, the baseband processor 808 may use DVB-S2x Adaptive Coding and Modulation to select which modulator/demodulator and coder(encoder)/decoder is used.

Returning to FIG. 10, the transmitter 812 is configured amplify the forward spot beam signal 810 for transmission via one of the antennas 106 via a spot beam. As shown in FIG. 10, the transmitter 812 may include a traveling-wave tube amplifier ("TWTA"). In other embodiments, the transmitter 812 may include any type of amplifier.

It should be appreciated that the processor 808 displayed in FIGS. 9 and 10 may also be used for the return baseband processor 820 of FIG. 8. The only differences may be the frequencies of the signals transmitted/received and the routing for the switch 1002. For example, the switch 1002 in the return baseband processor 820 may route portions of signals among one or more gateway stations 110 and/or one or more downlink feeds having a certain polarization and/or frequency band for the gateway station 110 (or another platform in a mesh or hub-and-spoke system).

Additional Platform Processor Embodiments

Figure 11:
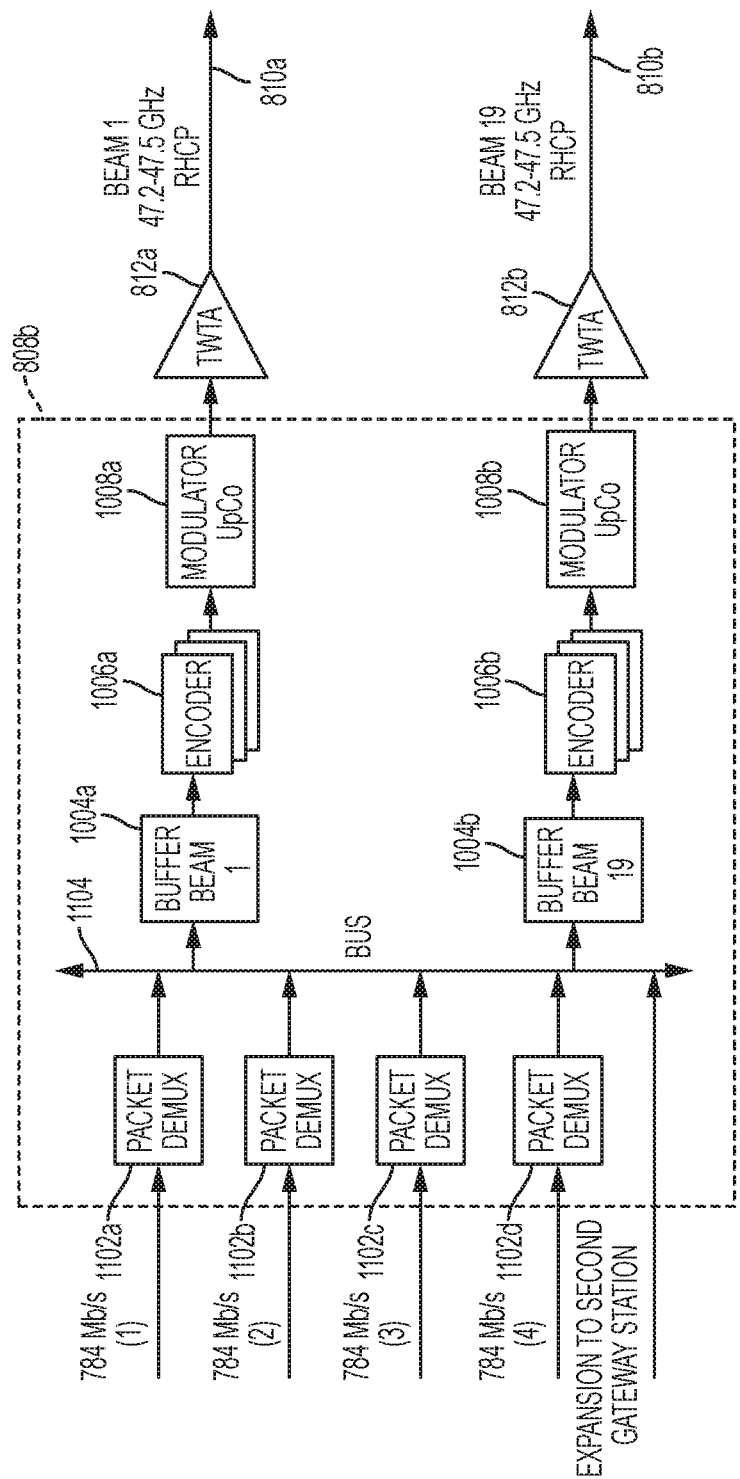
FIG. 11 shows a diagram of an alternative embodiment of the example processor of FIGS. 8 to 10, according to an example embodiment of the present disclosure.

FIG. 11 shows a diagram of an alternative embodiment of the back-end baseband processor 808b of FIG. 10, according to an example embodiment of the present disclosure. In this example, the baseband processor 808 is configured to process individual data packets instead of time-dividing a signal. In this example, the switch 1002 of the baseband processor 808 is replaced with a packet de-multiplexer 1102. As illustrated, the de-multiplexer 1102 for each forward feeder link signal is connected to a bus 1104 to enable the routing data packets or codeblocks to any spot beam. An uplink codeblock, such as uplink codeblock 1200 discussed in conjunction with FIG. 12, includes data with a high rate FEC code and/or a high modulation, such as 256 Quadrature amplitude modulation ("QAM"). For instance, the coding may follow the DVB-S2 Part II standard, which specifies the configuration of long and short codeblocks. It should be appreciated that shorter codeblocks sacrifice some performance for reduced complexity within the decoder 908. Alternatively, some of terrestrial cellular LTE modulation and coding may be used.

Figure 12:
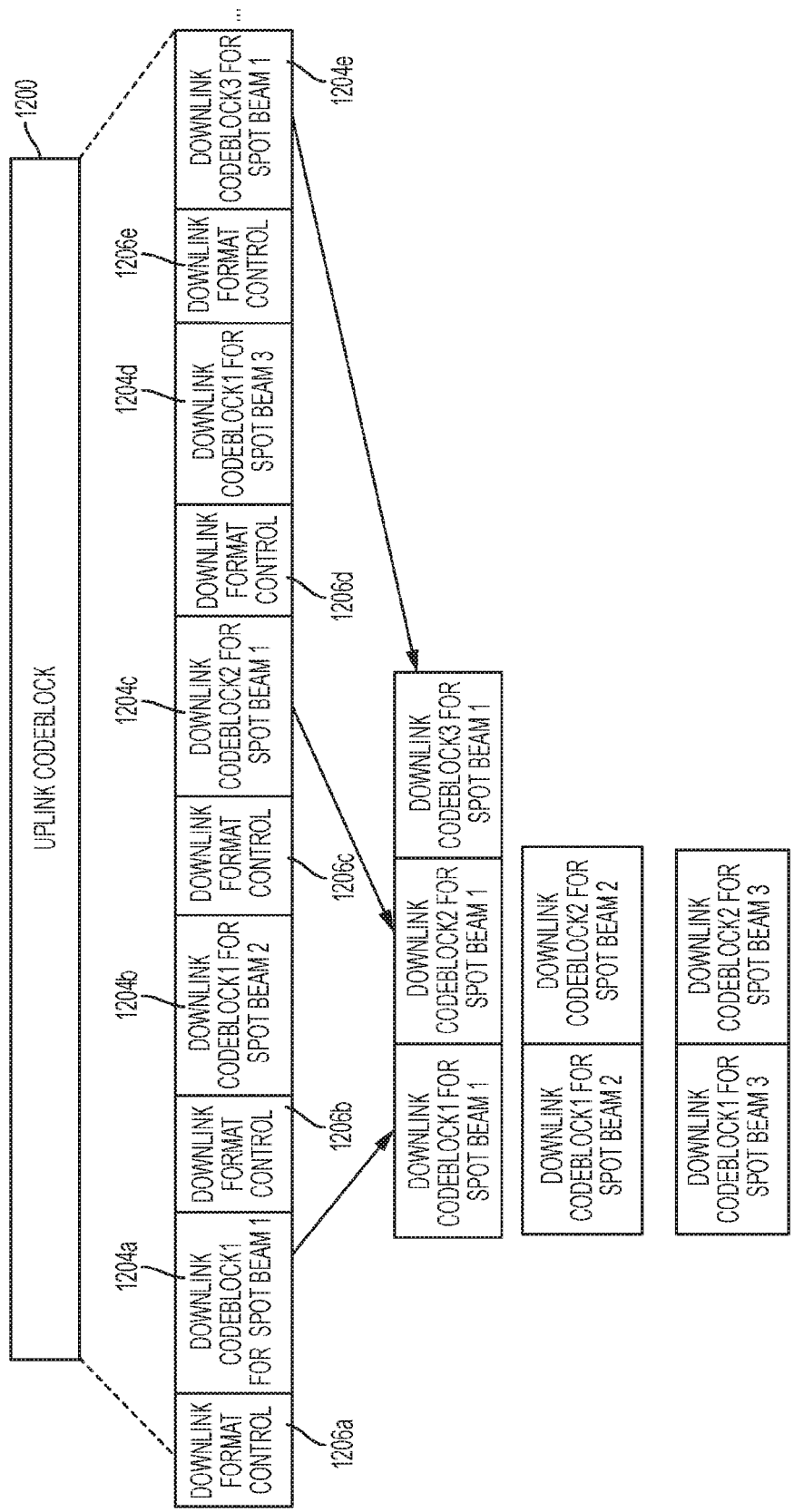
FIG. 12 shows a diagram of a codeblock transmitted within the example communication system of FIG. 1.

As illustrated in FIG. 12, the uplink codeblock 1200 (e.g., forward feeder link signal) includes a sequence of downlink codeblocks 1204 (e.g., data packets), each preceded by a downlink codeblock format control header 1206. The header 1206 identifies the downstream data stream, spot beam, or user terminal for the following codeblock 1204 in addition to the modulation and coding (e.g., MODCOD) mode to be used for the codeblock. It should be appreciated that the gateway station 110 knows the instantaneous data rate for each of the spot beams it serves and can accordingly insert 'dummy' data as needed to maintain a steady flow rate for each spot beam to avoid large dynamic buffers on the platform 102. The on-board queue or buffer for each downlink may be limited to two codeblocks. As illustrated in FIG. 12, the de-multiplexer 1102 of FIG. 11 is configured to separate the downlink codeblocks 1204 within the codeblock 1200 for each spot beam. For instance, the codeblocks 1204 for spot beam 1 are transmitted to the buffer 1004a in FIG. 11. The coding/modulation/up-conversion/and transmission of the buffered codeblocks 1204 as the forward spot beam signal 810 is similar to the example discussed in conjunction with FIG. 10.

Figure 13:
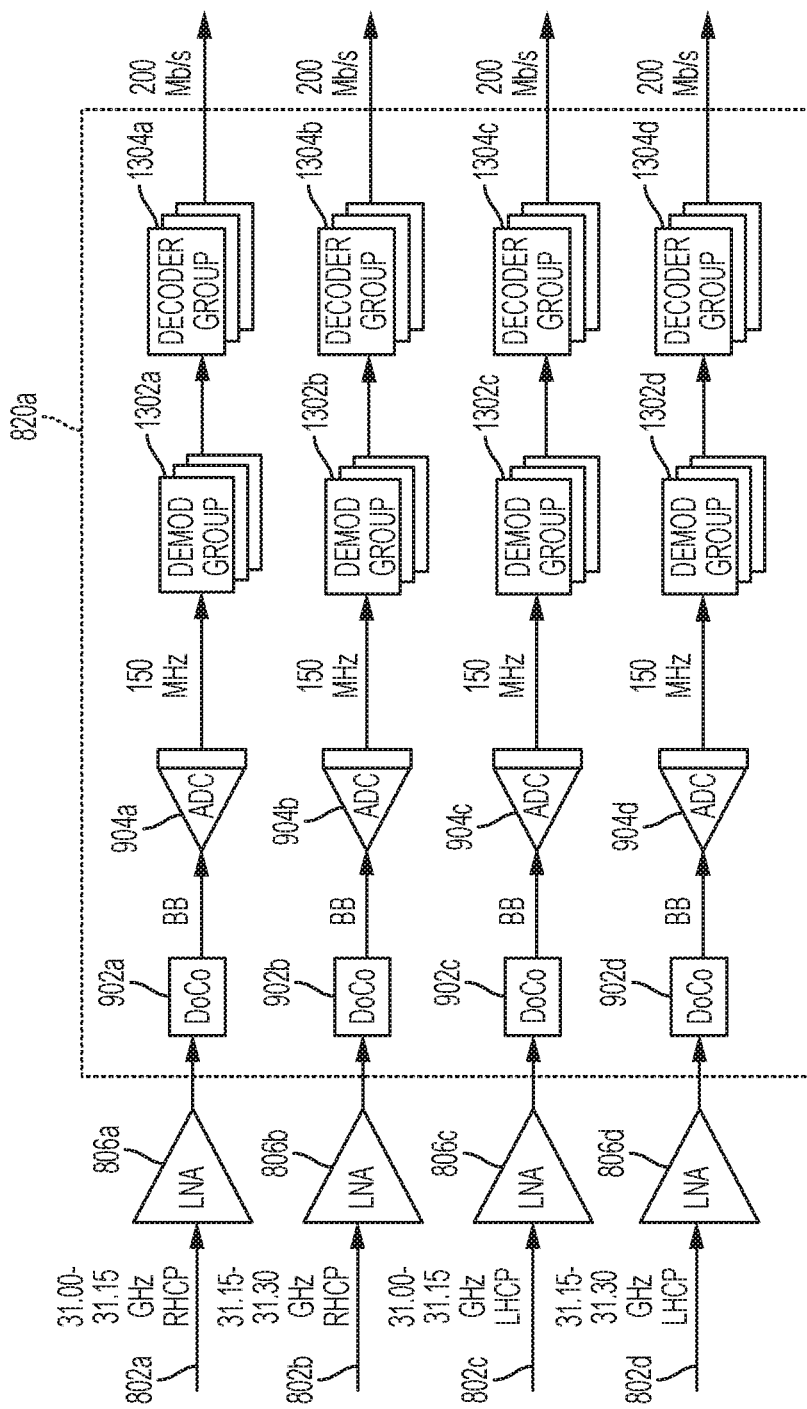
FIGS. 13 to 16 show diagrams of alternative embodiments of the example processor of FIGS. 8 to 10, according to an example embodiment of the present disclosure.
Figure 14:
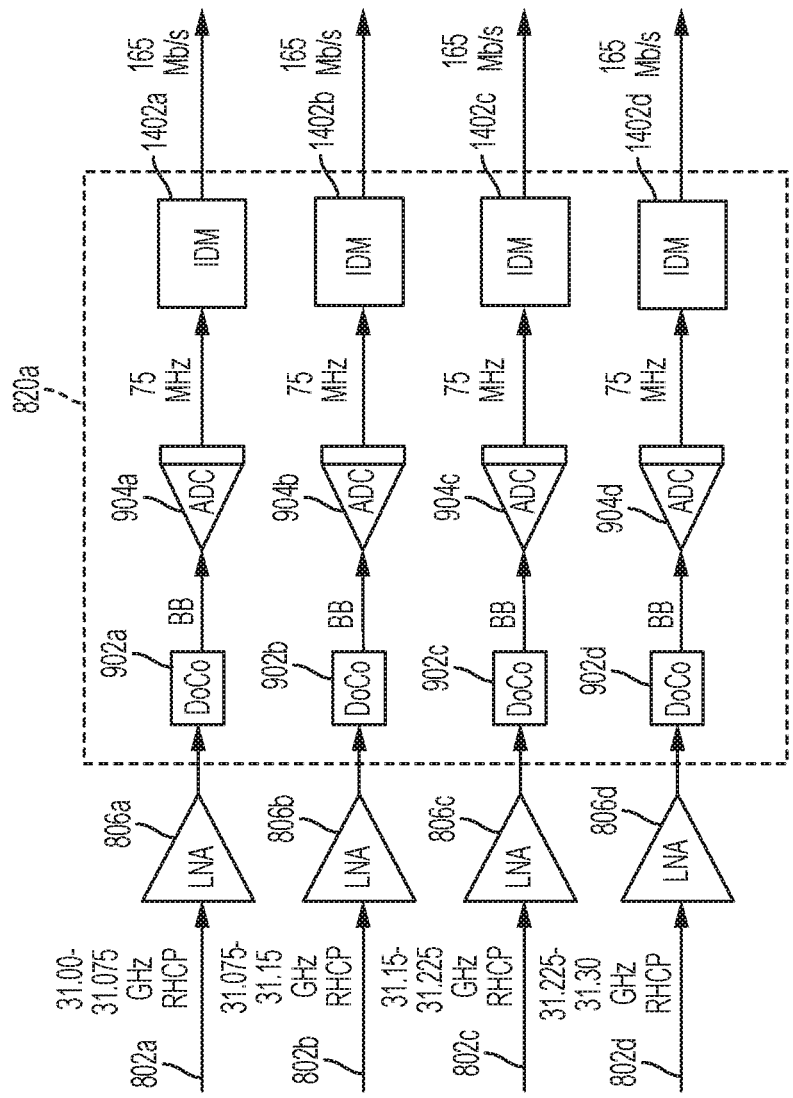

FIGS. 13 and 14 show diagrams of alternative embodiments of a front-end for the return baseband processor 820a, according to an example embodiment of the present disclosure. In particular, FIG. 13 shows an embodiment where 300 MHz of dual polarization bandwidth is received from the user terminals 108 in a plurality of cells or spot beams. In this embodiment, a demodulator group 1302 includes a plurality of selectable demodulators and a decoder group 1304 includes a plurality of decoders. As discussed above, such a configuration enables the modulation and/or coding of the signals to be changed at the gateway station 110 and/or the user terminals 108 based on conditions. For instance, a first demodulator supports QPSK modulation, a second demodulator supports 16 PSK modulation, a third demodulator supports 64 PSK modulation, and a fourth demodulator supports 256 PSK modulation.

FIG. 14 shows an embodiment where the demodulator group 1302 and the decoder group 1304 are replaced by an in-route demodulator and decoder ("IDM") 1402. In this embodiment, the IDM 1402 enables only about 1/2 the bandwidth being needed for the return signal to have roughly the same performance as the example shown in FIG. 13. This configuration enables only one polarization to be used for the return signals, meaning the transmission and reception of the return signals at the platform 102 are not always crossed.

Figure 15:
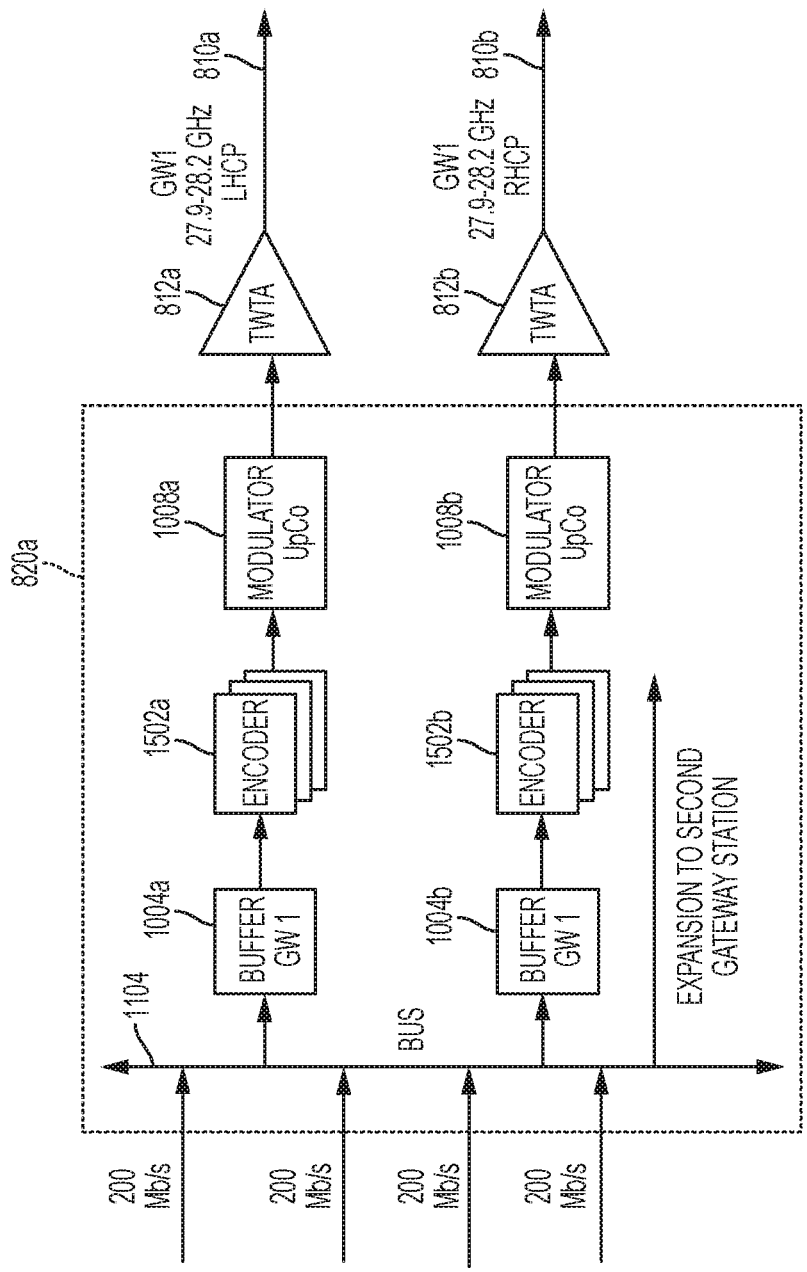
Figure 16:
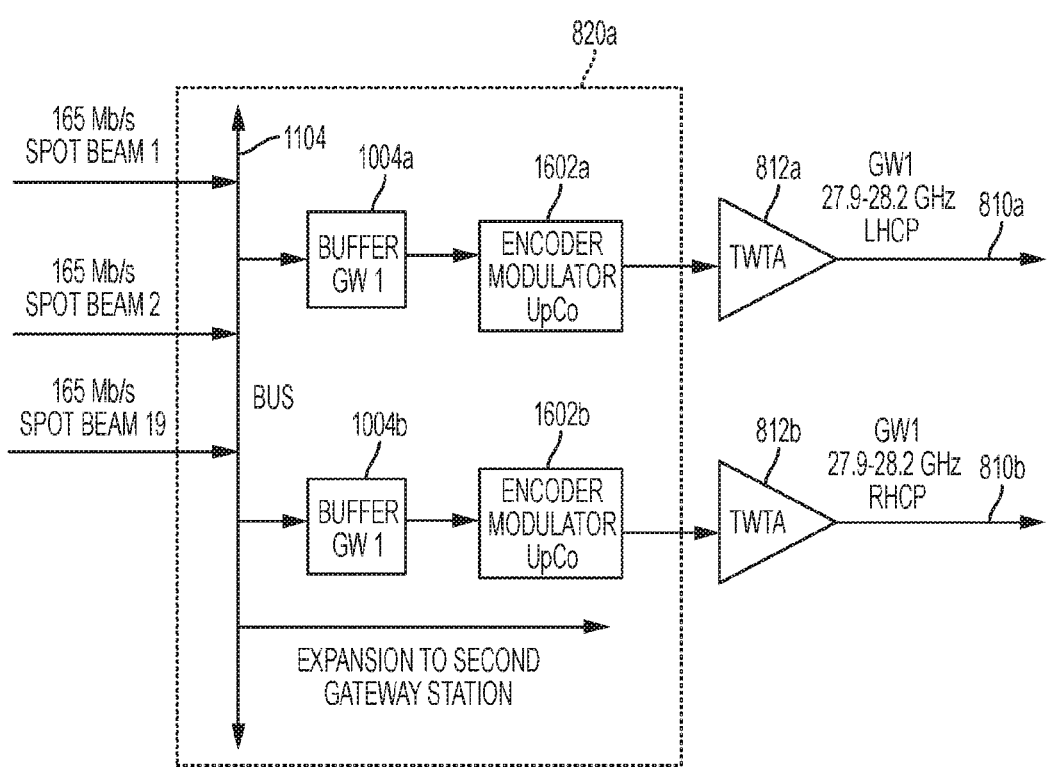

FIGS. 15 and 16 show diagrams of alternative embodiments of the back-end of the return baseband processor 820a of FIG. 8, according to an example embodiment of the present disclosure. In this example, de-multiplexers (not shown) are configured to route data packets or codewords 1204 via the bus 1104 to the appropriate buffer 1004. In the alternative example of FIG. 15, the bus 1104 is communicatively coupled to buffers for additional gateway stations 110 (or platforms). Such a configuration provides additional capacity beyond the limits of a single gateway station 110. FIG. 15 also shows that a set of encoders 1502 may be used to support different coding modes. The buffer 1004, the set of encoders 1502, the modulator/up-converter 1008, and the transmitter 812 designated for the second gateway station 110 operate as discussed in conjunction with FIGS. 8 and 10. FIG. 16 shows an example where the encoder set 1502 and the modulator/up-converter 1008 of FIG. 15 are combined within a single encoder/modulator/up-converter 1602.

It should be appreciated that the baseband processors 808 and 820 of FIGS. 8 to 16 may be adjusted to accommodate different reuse arrangements for the spot beams. For example, the configuration of the baseband processors 808 and 820 may enable 19 cells to be further divided into 37 cells to provide additional capacity. In such a configuration, the baseband processors 808 and 820 may include switches or routers to reuse the modulators/demodulators, buffers, and/or encoders/decoders for multiple spot beams. Alternatively, the baseband processors 808 and 820 may include additional modulators/demodulators, buffers, and/or encoders/decoders to expand capacity while the platform is in use.

Flowchart of the Example Process

Figure 17:
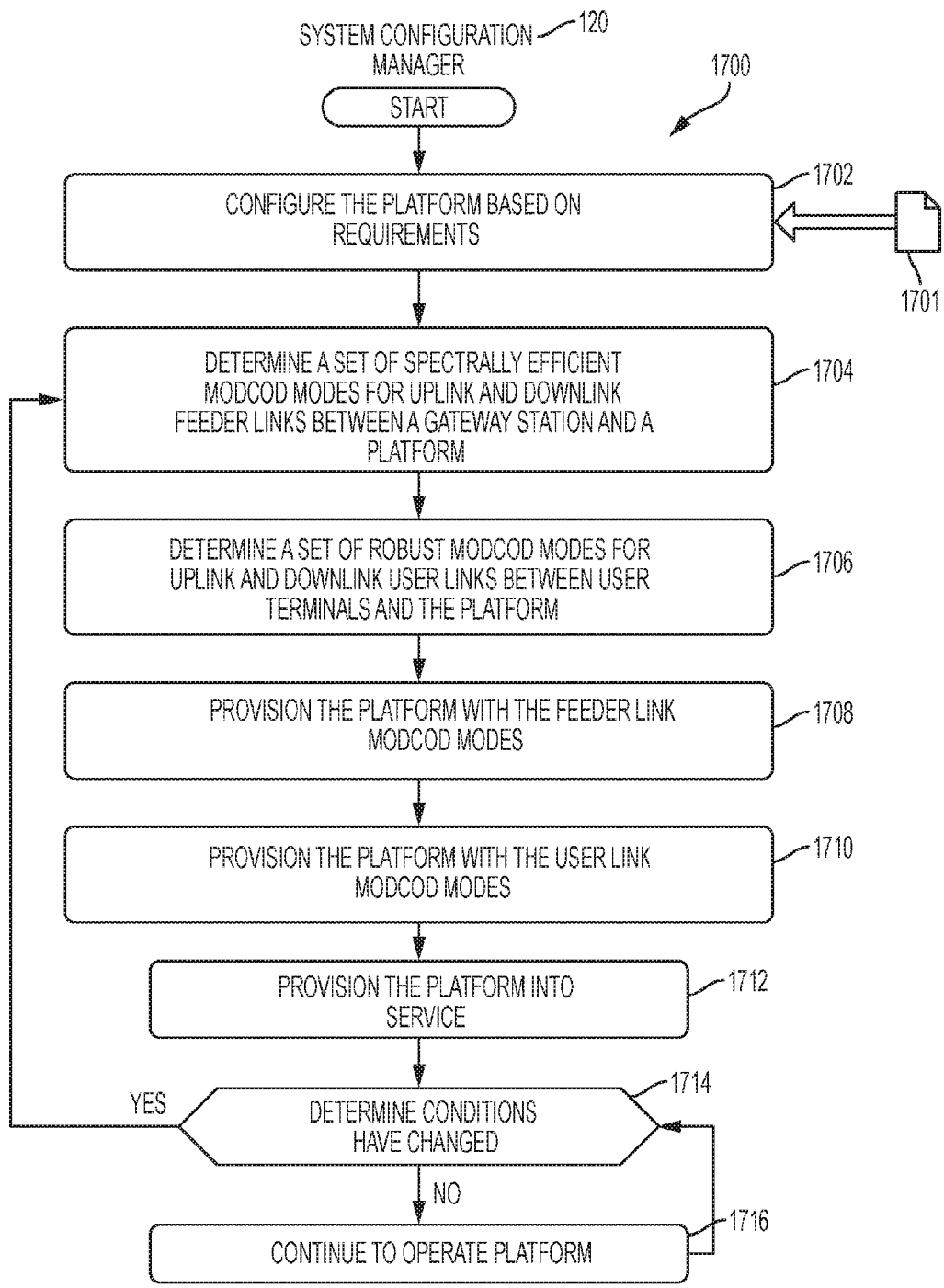
FIG. 17 illustrates a flow diagram showing an example procedure to configure the platform of FIGS. 1 to 16 with different MODCOD modes, according to an example embodiment of the present disclosure.

FIG. 17 illustrates a flow diagram showing an example procedure 1700 to configure the platform 102 of FIGS. 1 and 2 with different MODCOD modes, according to an example embodiment of the present disclosure. Although the procedure 1700 is described with reference to the flow diagram illustrated in FIG. 17, it should be appreciated that many other methods of performing the steps associated with the procedure 1700 may be used. For example, the order of many of the blocks may be changed, certain blocks may be combined with other blocks, and many of the blocks described are optional. Further, the actions described in procedure 1700 may be performed among multiple devices.

The example procedure 1700 of FIG. 17 operates on, for example, the system configuration manager 120 and/or the platform 102 of FIG. 1. The procedure 1700 begins when the system configuration manager 120 receives a request 1701 to provision a HAP (e.g., the platform 102 of FIG. 1) for a specified coverage area. The request 1701 may include, for example a latitude (e.g., geographic location) at which the proposed HAP will operate. The request 1701 may also include a season of the year in which the HAP will operate. Responsive to the request 1701, the system configuration manager 120 determines an altitude at which the HAP will operate in addition to a minimum elevation angle, a coverage area, bandwidth requirements and/or QoS requirements/parameters (block 1702). The system configuration manager 120 also determines a number of antennas, a beam width, elevation angle, gain, and antenna aperture for the platform (as described further in U.S. patent application Ser. No. 14/510,790, filed Mar. 5, 2015).

The system configuration manager 120 further determines MODCOD modes that are spectrally efficient for the links 114b and 116b between one or more gateway stations 110 and the platform 102 (block 1704). Moreover, the system configuration manager 120 determines MODCOD modes that are robust for the links 114a and 116a between one or more user terminals 108 and the platform 102 (block 1706). The determination of the MODCOD modes may take into any of the design or configurations of the processors 808 and 820 discussed in conjunction with FIGS. 8 to 16. The system configuration manager 120 may then provision the hardware 107 on the platform 102 to operate in conjunction with the MODCOD modes (blocks 1708 and 1710).

The example system configuration manager 120 then provisions the platform 102 into service (block 1712). While the platform 102 is in service, checks may be made by the system configuration manager 120, the gateway station 110, and/or the user terminals 108 to determine if signal propagation conditions have changed (e.g., heavy rain in a cell). Conditioned upon determining conditions have changed, the system configuration manager 120, the gateway station 110, and/or the user terminals 108 determine how the MODCOD modes should be changed (blocks 1704 and 1706). The system configuration manager 120, the gateway station 110, and/or the user terminals 108 may then instruct the platform 102 to adjust the processors 808 and/or 820 to compensate for the change or variation to the MODCOD mode. It should be appreciated that the MODCOD mode for only one user spot beam may change, with the corresponding changes being made in the platform 102 while the MODCOD mode for the other spot beams remains the same. The platform 102 continues to operate (block 1716) until conditions change again or until an instruction is received to land or end service.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It should also be understood that the example telecommunications platform disclosed herein may be an element of a larger system. Examples of larger system include relays between platforms, relays between platforms and GEO satellites, relays between platforms to gateways shared by those platforms, relays between gateways and GEO satellites.

The invention is claimed as follows:

1. A telecommunications platform apparatus comprising:
a gateway antenna configured to communicate with a ground-based gateway station;
a plurality of user antennas configured to provide communication coverage among a plurality of terminals within a specified area on the ground or in the air, each user antenna being configured to communicate with a specified cell within the specified area; and
a processor configured to:
demodulate and decode a first modulation scheme and a first coding scheme used for a feeder link provided by the gateway antenna, and
apply at least a second modulation scheme and a second coding scheme for user links provided in spot beams by the respective user antennas,
wherein the first modulation scheme and the first coding scheme is configured to be relatively more spectrally efficient for the feeder link compared to the second modulation scheme and the second coding scheme for the user links.

2. The apparatus of claim 1, wherein a first frequency band is provided for the feeder link and a second different frequency band is provided for the user links.

3. The apparatus of claim 1, further comprising a switch configured to route decoded baseband data to a buffer associated with a particular user antenna.

4. The apparatus of claim 1, wherein the first modulation scheme includes 16 phase-shift keying ("PSK"), the first coding scheme includes 3/4 forward error correction ("FEC"), the second modulation scheme includes Quadrature-PSK ("QPSK"), and the second coding scheme includes 1/2 FEC.

5. The apparatus of claim 1, wherein the first modulation scheme includes 64 PSK, the first coding scheme includes 4/5 FEC, the second modulation scheme includes QPSK, and the second coding scheme includes 1/2 FEC.

6. The apparatus of claim 1, wherein the first modulation scheme includes 256 PSK, the first coding/decoding scheme includes 13/18 FEC, the second modulation scheme includes QPSK, and the second coding scheme includes 1/2 FEC.

7. The apparatus of claim 1, wherein the telecommunications platform apparatus includes a high altitude platform ("HAP") that operates between 17 km and 22 km about a center of the specified area of the ground.

8. The apparatus of claim 1, wherein the plurality of user antennas are each configured to have an aperture to provide substantially equal-sized cells, and
wherein the apertures of the user antennas corresponding to cells at outer edges of the specified area on the ground have a larger size than apertures of user antennas corresponding to cells within a center of the specified area on the ground.

9. The apparatus of claim 1, wherein the processor is configured to vary the first modulation scheme and the first coding scheme according to changing conditions experienced by the feeder link.

10. The apparatus of claim 1, wherein the processor is configured to vary the second modulation scheme and the second coding scheme according to changing conditions experienced by the user links.

11. The apparatus of claim 1, wherein the processor is configured to vary the second modulation scheme and the second coding scheme among the user antennas.

12. The apparatus of claim 1, wherein the processor is configured to demodulate and decode the first modulation scheme and the first coding scheme for the feeder link in a sequence to minimize buffering requirements for the user links.

13. The apparatus of claim 1, wherein the plurality of user antennas form a frequency reuse pattern, each user antenna using a subset of total downlink frequency band and polarizations.

14. The apparatus of claim 13, wherein the plurality of user antennas alternately use the entire downlink frequency band in a time-hopping pattern.

15. The apparatus of claim 1, wherein the processor is configured to unequally partition the bandwidth of the feeder link among the user links for the plurality of user antennas.

16. The apparatus of claim 15, wherein the processor is configured to partition the bandwidth based on at least one of in-band signaling and out-of-band signaling.

17. The apparatus of claim 1, wherein the processor is configured to:
demodulate and decode the first modulation scheme and the first coding scheme used for a return user spot beam signal provided by one of the plurality of user antennas; and
apply the second modulation scheme and the second coding scheme for a return feeder link signal provided by the gateway antenna.

18. A telecommunications platform apparatus comprising:
a gateway antenna configured to communicate with a ground-based gateway station via a feeder link;
a plurality of user antennas configured to provide communication coverage among a plurality of terminals within a specified area on the ground or in the air, each user antenna being configured to communicate with a specified cell within the specified area via a respective user link;
a processor including a forward baseband processor having:
a front-end component, during a reception time period having a duration of (1-α), configured to:
receive a forward feeder link signal from the gateway antenna received via the feeder link,
demodulate a first modulation scheme on the forward feeder link signal,
decode a first coding scheme on the demodulated forward feeder link signal, and
cause a switch to route the decoded forward feeder link signal to at least one forward user spot beam signal related to one of the user links based on a time plan; and
a back-end component, during a transmission time period having a duration of α, configured to:
perform error correction coding using a second coding scheme on the switched forward user spot beam signal,
modulate using a second modulation scheme the coded forward user spot beam signal, and
transmit the modulated forward user spot beam signal via one of the plurality of user antennas,
wherein the first modulation scheme and the first coding scheme is configured to be relatively more spectrally efficient than the second modulation scheme and the second coding scheme.

19. The apparatus of claim 18, wherein a single frequency band is provided for the feeder link and the user links.

20. The apparatus of claim 18, wherein the time plan specifies to which forward user spot beam signal the decoded forward feeder link signal is to be switched based on a time the forward feeder link signal is received.

21. The apparatus of claim 18, wherein the forward baseband processor determines the time plan from signaling information contained in headers appended to an uplink feeder link packet within the forward feeder link signal.

22. The apparatus of claim 18, wherein the time plan includes at least one of fixed time boundaries and dynamic time boundaries based on a received out-of-band command.

23. The apparatus of claim 18, wherein the plurality of user antennas are each configured to have an aperture to provide substantially equal-sized cells, and
wherein the apertures of the user antennas corresponding to cells at outer edges of the specified area have a larger size than apertures of user antennas corresponding to cells within a center of the specified area.

24. The apparatus of claim 18, wherein the processor includes a return baseband processor having:
a front-end component configured to:
receive a return user spot beam signal from at least one of the plurality of user antennas,
demodulate the first modulation scheme used on the return user spot beam signal,
decode the first coding scheme used on the demodulated return user spot beam signal, and
cause the switch to route the decoded return user spot beam signal to a return feeder link signal based on the time plan; and
a back-end component configured to:
code the switched return feeder link signal using the second coding scheme,
modulate the coded return feeder link signal using the second modulation scheme, and
transmit the modulated return feeder link signal via the gateway antenna.

25. The apparatus of claim 24, wherein the time plan specifies to which return link signal the decoded return spot beam signal is to be switched based on a time the return link signal is received.

26. The apparatus of claim 24, further comprising a platform antenna configured to communicate with a second telecommunications platform apparatus via a platform feeder link,
wherein at least one of
the back-end component is configured to transmit the modulated forward user spot beam signal via the platform antenna to the second telecommunications platform, and
the front-end component configured is configured to transmit the modulated return feeder link signal via the platform antenna to the second telecommunications platform.

27. A telecommunications platform apparatus comprising:
a first gateway antenna configured to communicate with a first ground-based gateway station via a first feeder link;
a second gateway antenna configured to communicate with a second ground-based gateway station via a second feeder link;
a plurality of user antennas configured to provide communication coverage among a plurality of terminals within a coverage area on the ground, each user antenna being configured to communicate with a specified cell within the coverage area via respective user links; and
a forward baseband processor including:
a front-end component, during a reception time period having the duration of $(1-\alpha)$, configured to:
receive a first forward feeder link signal from the first gateway antenna,
receive a second forward feeder link signal from the second gateway antenna,
demodulate the first and second forward feeder link signals using a first modulation scheme,
decode the demodulated forward feeder link signals using a first coding scheme, and
de-multiplex the decoded forward feeder link signals; and
a back-end component, during a transmission time period having the duration of $\alpha$, configured to:
multiplex, for at least one forward user spot beam signal, a portion of the decoded forward feeder link signal with portions of other decoded feeder link signals within a buffer,
code the multiplexed forward user spot beam signal using a second coding scheme,
modulate the coded forward user spot beam signal using a second modulation scheme, and
transmit the modulated forward user spot beam signal via one of the plurality of user antennas,
wherein the first modulation scheme and the first coding scheme is configured to be relatively more spectrally efficient to enable an uplink frequency band of the first and second forward feeder link signals to provide the total data rate needed by all forward downlinks provided the plurality of user antennas using the second modulation scheme and the second coding scheme.

28. The apparatus of claim 27, wherein $\alpha$ is between 0.10 and 0.60 milliseconds (ms).

29. The apparatus of claim 27, wherein the first and the second gateway antennas are at least one of mechanically and electrically controlled to continually point at the respective gateway stations.

30. The apparatus of claim 27, wherein the telecommunications platform apparatus includes a high altitude platform.

31. The apparatus of claim 30, wherein the high altitude platform operates between 17 km and 22 km above a center of the specified area of the ground.

32. The apparatus of claim 27, wherein the front-end component
uses the first modulation scheme and the first coding scheme for the first forward feeder link signal from the first gateway antenna, and
uses a third modulation scheme and third coding scheme that is more spectrally efficient than the second modulation and coding scheme for the second forward feeder link signal from the second gateway antenna.

33. The apparatus of claim 27, wherein plurality of user antennas are each configured to have an aperture to provide substantially equal-sized cells, and
wherein the apertures of the antennas corresponding to cells at outer edges of the coverage area have a larger size than apertures of antennas corresponding to cells within a center of the coverage area.

34. The apparatus of claim 27 wherein the forward baseband processor is configured to de-multiplex the decoded forward feeder link signals on a per-packet basis based on headers contained within at least one of codeblocks and packets of the decoded forward feeder link signals.

35. The apparatus of claim 27, further comprising a return baseband processor having:
a front-end component configured to:
receive a return user spot beam signal from one of the plurality of user antennas,
demodulate the return user spot beam signal,
decode the demodulated return user spot beam signal, and
de-multiplex the decoded return user spot beam signal; and
a back-end component configured to:
multiplex, for a return feeder link signal, a portion of the decoded return user spot beam signal with portions of other decoded return user spot beam signals within a buffer,
code the multiplexed return feeder link signal,
modulate the coded return feeder link signal, and
transmit the modulated return feeder link signal via the gateway antenna.

* * * * *